(12) United States Patent
Zou et al.

(10) Patent No.: US 12,242,424 B2
(45) Date of Patent: *Mar. 4, 2025

(54) PERSISTENT MEMORY TIERING SUPPORTING FAST FAILOVER IN A DEDUPLICATED FILE SYSTEM

(71) Applicant: EMC IP Holding Company LLC, Hopkinton, MA (US)

(72) Inventors: Yong Zou, San Jose, CA (US); Rahul Ugale, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/344,568

(22) Filed: Jun. 10, 2021

(65) Prior Publication Data

US 2022/0398221 A1    Dec. 15, 2022

(51) Int. Cl.
*G06F 15/16* (2006.01)
*G06F 16/16* (2019.01)
*G06F 16/174* (2019.01)

(52) U.S. Cl.
CPC ........ *G06F 16/1748* (2019.01); *G06F 16/164* (2019.01)

(58) Field of Classification Search
None
See application file for complete search history.

(56) References Cited

U.S. PATENT DOCUMENTS

| | | | | |
|---|---|---|---|---|
| 8,392,384 | B1 * | 3/2013 | Wu | G06F 16/1748 |
| | | | | 711/134 |
| 2010/0070478 | A1 * | 3/2010 | Anglin | G06F 11/1464 |
| | | | | 707/674 |
| 2011/0161723 | A1 * | 6/2011 | Taleck | G06F 11/1469 |
| | | | | 714/E11.073 |
| 2012/0011398 | A1 * | 1/2012 | Eckhardt | G06F 11/2097 |
| | | | | 714/15 |
| 2017/0293447 | A1 * | 10/2017 | Bivens | G06F 11/3433 |
| 2021/0326309 | A1 | 10/2021 | Natarajan | |
| 2021/0342215 | A1 | 11/2021 | Chawla | |
| 2021/0326216 | A1 | 12/2021 | Subramanian | |
| 2022/0035524 | A1 | 2/2022 | Subramanian | |

(Continued)

OTHER PUBLICATIONS

Huang et al. Optimizing Crash Dump in Virtualized Environments. VEE'10, 2010, pp. 25-36. (Year: 2010).*

(Continued)

*Primary Examiner* — Alex Gofman
*Assistant Examiner* — Shelly X Qian
(74) *Attorney, Agent, or Firm* — Staniford Tomita LLP

(57) ABSTRACT

A memory tier including persistent memory (PMEM) devices is established in nodes of a cluster system having a deduplicated file system. At least a portion of metadata generated by the deduplicated file system is persisted to the memory tier. The portion of metadata includes an index of fingerprints corresponding to data segments stored by the deduplicated file system to a storage pool. A determination is made that an instance of the deduplicated file system has failed. A new instance of the deduplicated file system is started to recover file system services by loading the index of fingerprints from the memory tier.

17 Claims, 21 Drawing Sheets

(56) References Cited

U.S. PATENT DOCUMENTS

2022/0083422 A1    3/2022    Curtis-maury

OTHER PUBLICATIONS

Patterson et al. SnapMirror: File System Based Asynchronous Mirroring for Disaster Recovery. USENIX FAST 2002 Conference on File and Storage Technologies, pp. 1-14. (Year: 2002).*

Weisberg et al. Using 4KB Page Size for Virtual Memory is Obsolete. IEEE IRI 2009, pp. 262-265. (Year: 2009).*

"Create a Highly Available Memory Tier", Nov. 30, 2020, MemVerge (Year: 2020).

* cited by examiner

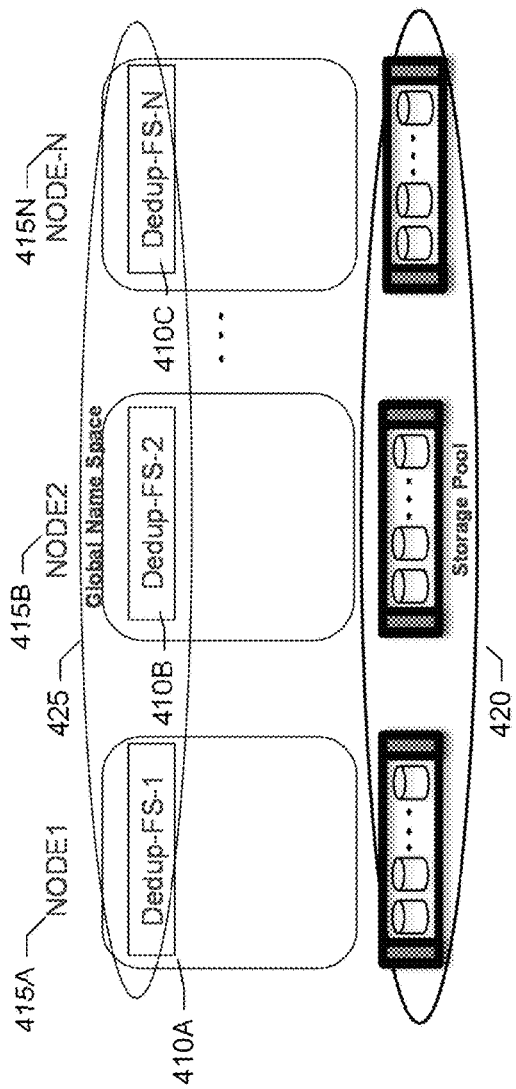
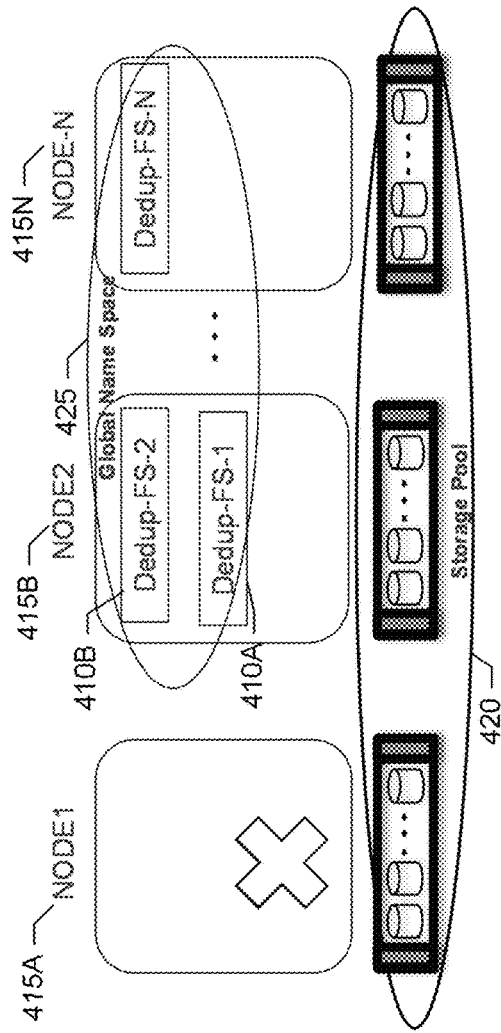
FIG. 4
FIG. 5

PERSISTENT MEMORY TIERING SUPPORTING FAST FAILOVER IN A DEDUPLICATED FILE SYSTEM

CROSS-REFERENCE TO RELATED APPLICATIONS

This application is related to co-pending U.S. patent application Ser. No. 17/344,614, filed Jun. 10, 2021, and which is incorporated herein by reference for all purposes.

TECHNICAL FIELD

The present invention relates generally to information processing systems, and more particularly to file systems.

BACKGROUND

Organizations often have a need for high availability computing environments to support critical services. Ideally, a high availability system offers full-time availability of services. High availability systems are premised on the idea that if a service happens to fail, the system can quickly restart the service with little or no disruption to clients that may be relying on the service.

One type of system in which high availability is desirable is a file system. A file system organizes data in storage and presents that data to clients in a logical format. A deduplicated file system is a type of file system that can reduce the amount of redundant data that is stored. A deduplicated file system may be available as part of a backup or data protection system for a set of clients in the organization. When, for example, files are to be saved to the deduplicated file system, the file system determines whether or not file data already exists in the file system. File data that is unique, e.g., does not already exist, is stored. File data that is not unique, e.g., is redundant, is not stored. Instead, the file system generates metadata referencing the already stored file data. The metadata can be used to determine whether subsequent incoming file data is redundant and also allows the files to be later reconstructed.

A deduplicated file system, unlike traditional file systems, thus maintains an extremely large amount of metadata in order to facilitate deduplication operations. The need to maintain such a large amount of metadata is problematic when trying to recover file system services due to failures. The amount of time required to restart and recover a deduplicated file system service can sometimes be so lengthy as to result in the clients experiencing timeout events. A timeout can occur when a client does not receive a response from a file system server within a certain amount of time. As a result, the client may disconnect from the server. This can be very disruptive to the ongoing operations of the organization.

There is a need for improved systems and techniques to support a deduplicated file system as a high availability system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 4 shows an architecture of a deduplicated file system, according to one or more embodiments.

FIG. 5 shows an example of a failover of the deduplicated file system shown in FIG. 4, according to one or more embodiments.

DETAILED DESCRIPTION

Figure 1:
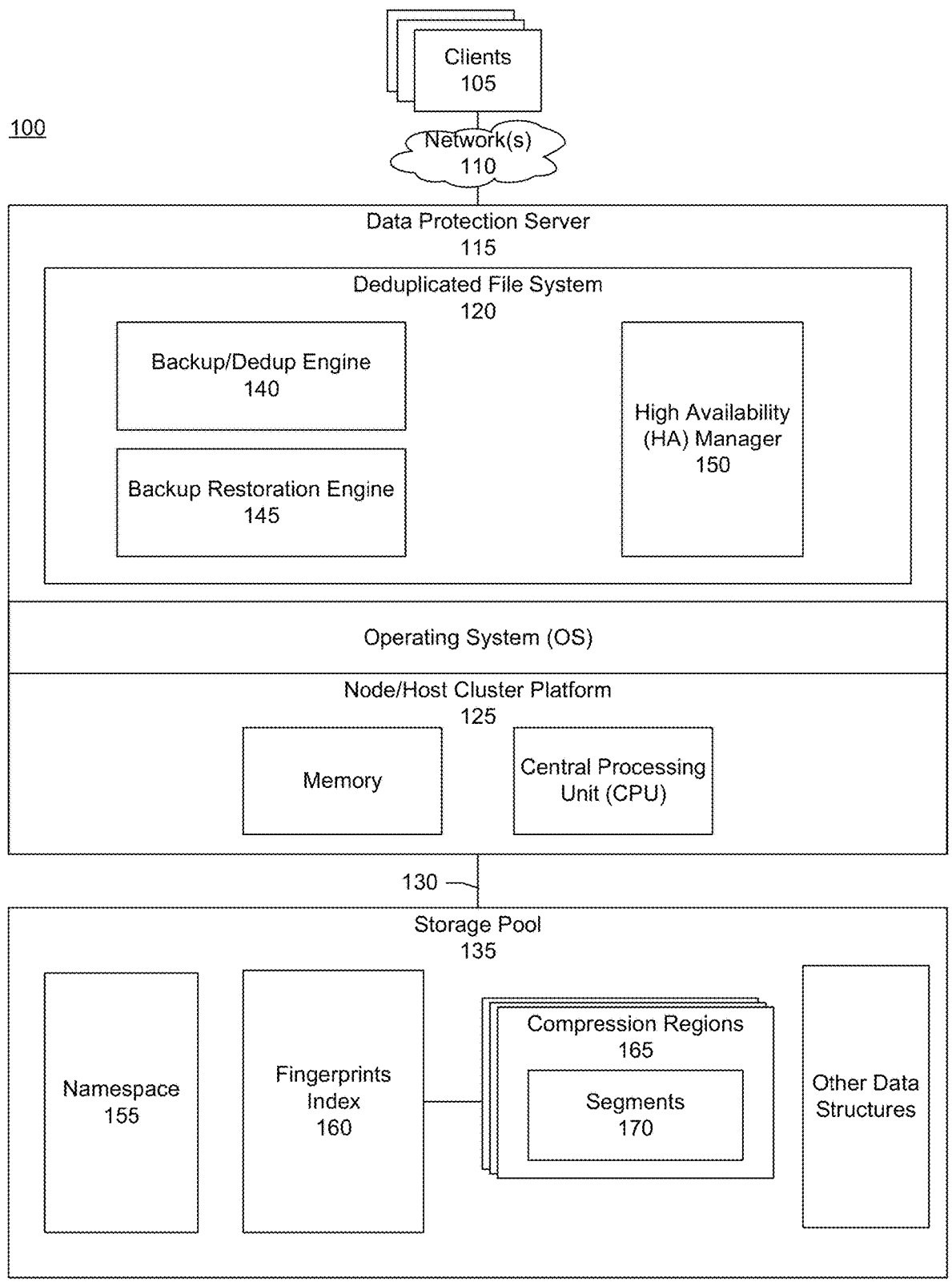
FIG. 1 shows a block diagram of an information processing system comprising a deduplicated file system, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

FIG. 1 shows a simplified block diagram of an information processing system 100 within which methods and systems for reducing the recovery and failover time of a deduplicated file system service may be implemented. The example shown in FIG. 1 includes a set of clients 105 connected via a network 110 to a data protection system or server 115. The data protection server includes a deduplicated file system 120 distributed across a set of cluster nodes 125 that are connected via an interconnect 130 to a storage pool 135. The cluster can have any number of nodes. The file system includes a backup and deduplication engine 140, backup restoration engine 145, and high availability (HA) manager 150. It should be appreciated that the blocks shown in FIG. 1 and other figures may be functional and there can be many different hardware and software configurations to implement the functions described.

The clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage pool may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, or an object or cloud storage service. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, the storage pool may represent logical storage that includes any number of physical storage devices connected to form a logical storage.

The storage pool provides backup storage of client files along with storage of other data structures to facilitate deduplication, organization, compression, redundancy, and performance of file system services. In particular, there is a namespace 155, fingerprints index 160, and compression regions 165 into which file data segments 170 are compressed. The namespace provides an organizing structure for the files. The fingerprints index may be associated with one or more compression regions and includes a listing of fingerprints corresponding to segments already stored and residing at the storage pool. In an embodiment, each cluster node may be associated with a deduplication domain within which deduplication is performed. Each deduplication domain may include a fingerprint index. There can be multiple fingerprint index buffers.

In brief, the backup and deduplication engine is responsible for backing up data (e.g., files) generated by the clients to the storage pool. In an embodiment, a part of the backup operation includes deduplication operations to reduce the amount of redundant data that is stored. The restoration engine is responsible for restoring the backed up data to the clients. Such restorations may be performed to restore files that were lost due to disaster, accidental deletion, or other data loss event.

The high availability (HA) manager is responsible for ensuring continuous or near-continuous availability of file system services. The high availability manager facilitates the operation of the data protection system as a high availability system. The high availability manager monitors health of the cluster nodes and file system instances and restarts the file system when a failure or crash has been detected.

In embodiment, the data protection system is provided as a high availability system including two or more nodes (e.g., three, four, five, or more than five nodes) where each node runs an instance of the file system. In some cases, a particular instance may fail. The failure may be due to, for example, a hardware or operating system kernel failure on a node hosting the particular instance. In this case, the entire node may become unavailable. As another example, the node hardware or kernel may remain available, but there may be a software bug in the file system or other application program that causes processes of the file system to fail. In either case, it is desirable to quickly restart a new instance of the file system on another node of the cluster (as in cases where the existing node is unavailable) or restart the new instance on the existing node (as in cases where the existing node remains available).

Health monitoring may be performed using any competent technique such as heartbeat communications or status reporting. For example, a node of the cluster may be configured to transmit heartbeat messages to a central manager or other nodes of the cluster at regular intervals. A failure to receive a heartbeat message from a node by a certain threshold time may indicate that the node has experienced a failure. In this case, a new instance of the file system may be triggered to restart on another different node of the cluster. To detect file system crashes, an instance of the file system on a node of the cluster may similarly be configured to transmit heartbeat messages at regular intervals. A failure to receive a heartbeat message from the file system instance by a certain threshold time may indicate that the file system instance has crashed. Continued receipt of heartbeat messages from the node may indicate that the node remains available. In this case, a new instance of the file system may be restarted on the same node.

A file system provides a way to organize data stored in a storage system and present that data to clients and applications in a logical format. The file system supports network protocols for accessing remote centrally stored data. An example of such a protocol includes Network File System (NFS). NFS is a distributed file system protocol originally developed by Sun Microsystems in 1984. NFS is an open standard and allows a user on a client computer to access files over a computer network much like local storage is accessed. NFS allows the client computer to mount a remote file system as if it were a local file system. Thus, users—regardless of what workstation they may be using—can have access to their files in a centrally managed manner. Such file systems facilitate document and workspace sharing and data consistency as users on the network will be accessing the same set of files. Other examples of supported file system protocols allowing for remote access include Common Internet File System (CIFS), Server Message Block (SMB), Data Domain (DD) Boost, and others. A client may run any number of different types of protocols.

More particularly, the file system organizes the data into files and folders into which the files may be stored. When a client requests access to a file, the file system issues a file handle or other identifier for the file to the client. The client can use the file handle or other identifier in subsequent operations involving the file. A namespace of the file system provides a hierarchical organizational structure for identifying file system objects through a file path. A file can be identified by its path through a structure of folders and subfolders in the file system. A file system may hold many hundreds of thousands or even many millions of files across many different folders and subfolders and spanning thousands of terabytes.

Figure 2:
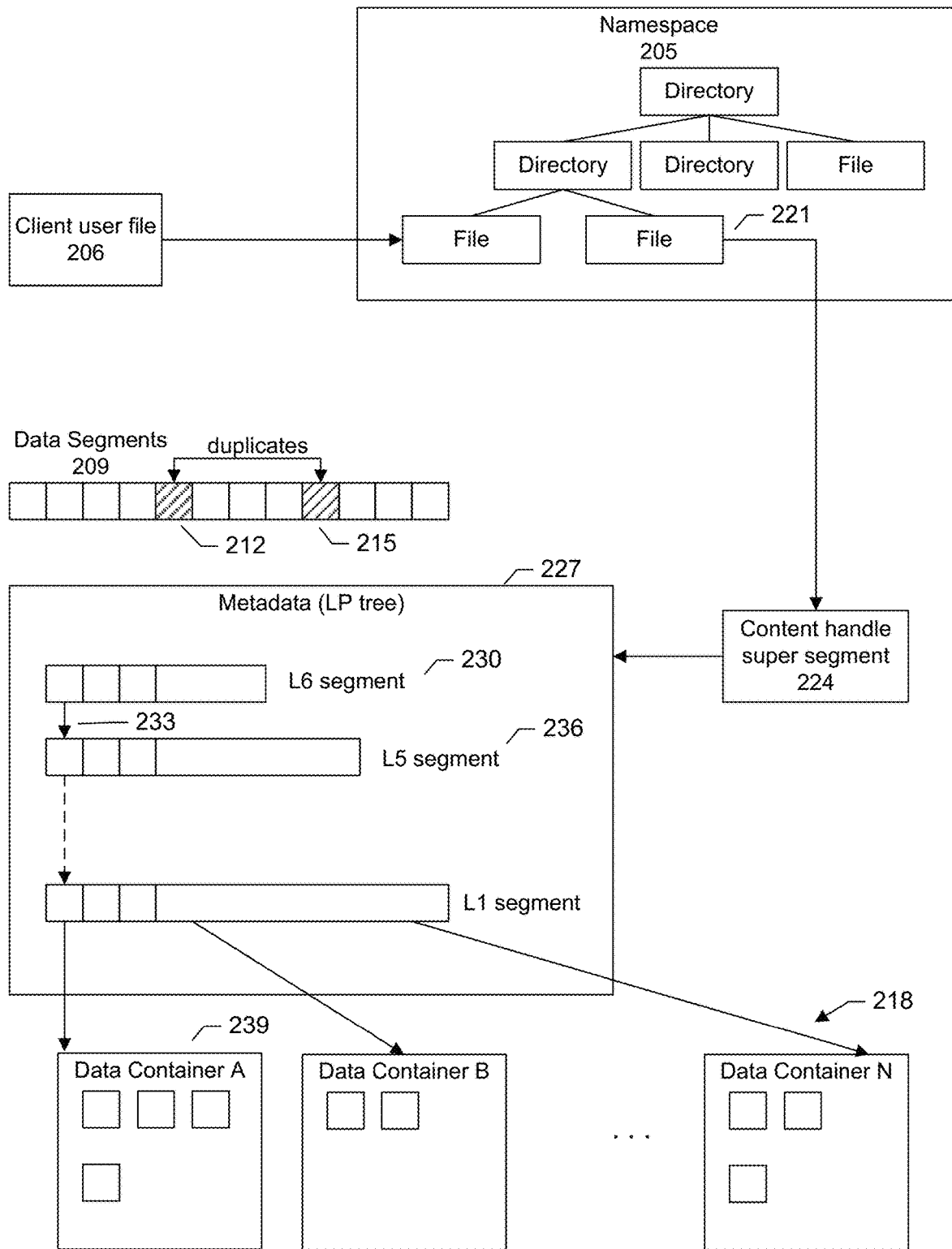
FIG. 2 shows an example of a deduplication process, according to one or more embodiments.

A deduplicated file system is a type of file system that can reduce the amount of redundant data that is stored. FIG. 2 shows a block diagram illustrating a deduplication process of the file system according to one or more embodiments. As shown in the example of FIG. 2, the file system maintains a namespace 205. In an embodiment, each node of a cluster is responsible for a particular portion of the namespace and each node may perform deduplication within its assigned portion of the namespace. Further details of a file system namespace are provided in FIG. 3 and the discussion accompanying FIG. 3.

As data, such as incoming client user file 206, enters the file system, it is segmented into data segments 209 and filtered against existing segments to remove duplicates (e.g., duplicate segments 212, 215). A segment that happens to be the same as another segment that is already stored in the file system may not be again stored. This helps to eliminate redundant data and conserve storage space. Metadata, however, is generated and stored that allows the file system to reconstruct or reassemble the file using the already or previously stored segment. Metadata is different from user data. Metadata may be used to track in the file system the location of the user data within the shared storage pool. The amount of metadata may range from about 2 or 4 percent the size of the user data.

More specifically, the file system maintains among other metadata structures a fingerprint index. The fingerprint index includes a listing of fingerprints corresponding to data segments already stored to the storage pool. A cryptographic hash function (e.g., Secure Hash Algorithm 1 (SHA1)) is applied to segments of the incoming file to calculate the fingerprints (e.g., SHA1 hash values) for each of the data segments making up the incoming file. The fingerprints are compared to the fingerprint index. Matching fingerprints indicate that corresponding data segments are already stored. Non-matching fingerprints indicate that the corresponding data segments are unique and should be stored.

Unique data segments are stored in fixed size immutable containers 218. There can be many millions of containers tracked by the file system. The fingerprint index is updated with the fingerprints corresponding to the newly stored data segments. A content handle 221 of the file is kept in the file system's namespace to support the directory hierarchy. The content handle points to a super segment 224 which holds a reference to a top of a segment tree 227 of the file. The super segment points to a top reference 230 that points 233 to metadata 236 and data segments 239.

In other words, in a specific embodiment, each file in the file system may be represented by a segment tree. The segment tree includes a set of segment levels arranged into a hierarchy (e.g., parent-child). Each upper level of the segment tree includes one or more pointers or references to a lower level of the segment tree. A last upper level of the segment tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A segment tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes.

In other words, in an embodiment, every segment in the file system is identified by a 24 byte key (or the fingerprint of the segment), including the LP segments. Each LP segment contains references to lower level LP segments. An example of a tree data structure includes a binary tree.

Figure 3:
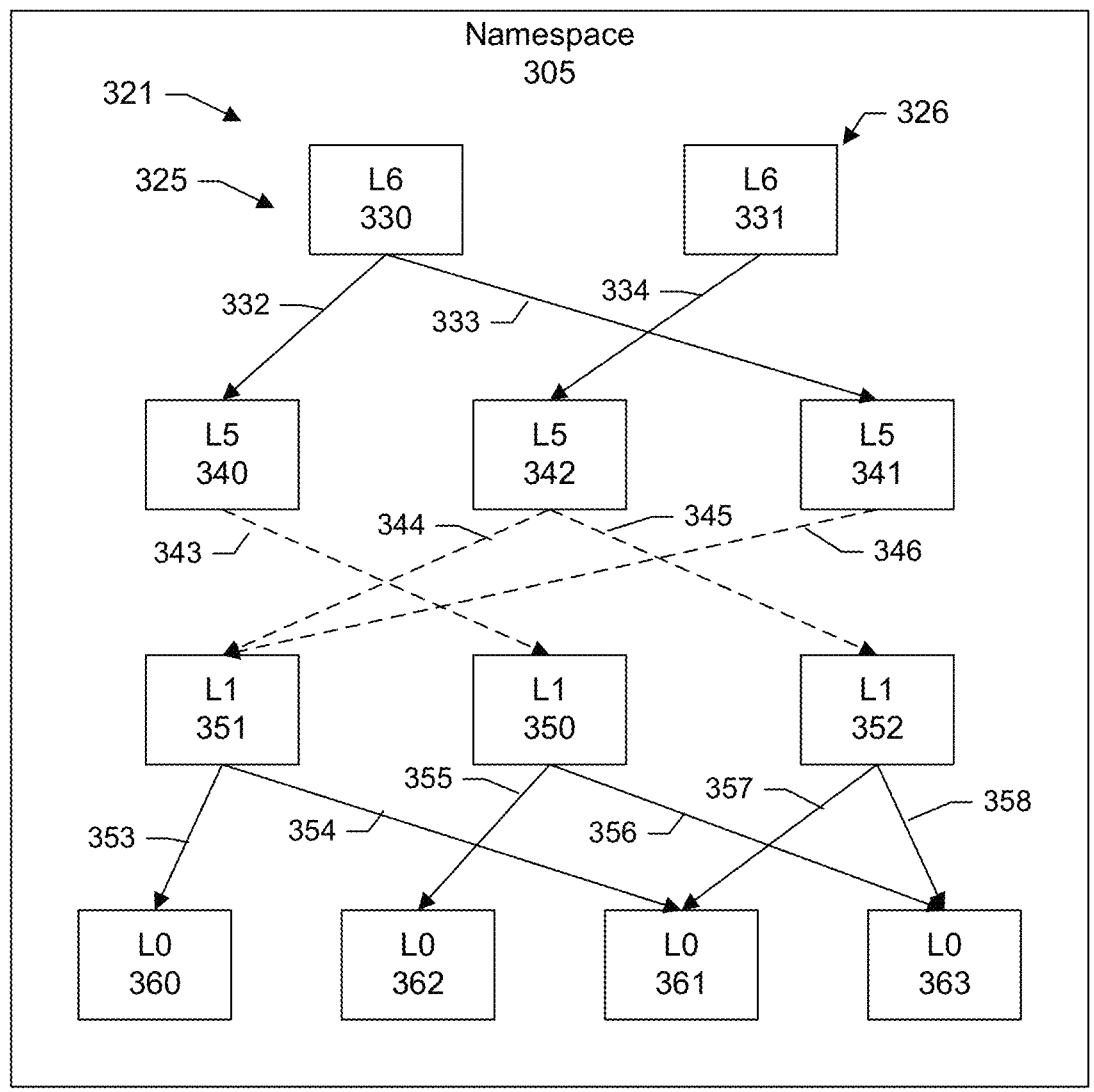
FIG. 3 shows an example of a namespace, according to one or more embodiments.

FIG. 3 shows further detail of a namespace 305 of the file system that may be used to organize the client data stored in the shared storage pool. The namespace includes a set of segment trees 321 where each file in the file system is represented by a segment tree. A segment tree includes a set of segment levels arranged in a hierarchy. In a specific embodiment, a segment tree can have up to seven levels that may be labeled L6 to L0. For example, one or more intermediate levels may not be present for a relatively small file. A relatively small file may have, in addition to an L0 segment, just an L6 and L1 segment. A relatively large file may have, in addition to an L0 segment, an L6, L5, L4, L3, L2, and L1 segment.

Segments from L6 to L1 are upper level segments that store metadata (e.g., fingerprints) and may be referred to as LP segments. The lowest level segments are the L0 segments which represent actual data content of the file. An upper level segment references one or more lower level segments. Thus, an L6 segment includes an array of L5 references. An L5 segment includes an array of L4 references. An L4 segment includes an array of L3 references. An L3 segment includes an array of L2 references. An L2 segment includes an array of L1 references. An L1 segment includes an array of L0 references. In other words, lower level segments are referenced by higher level segments.

The example shown in FIG. 3 shows segment levels L6, L5, L1, and L0. Segment levels L4, L3, and L2 have been omitted for purposes of clarity. An L6 segment forms a root or parent. Thus, in the example shown in FIG. 3, there is a first segment tree 325 having an L6 segment 330 and representing a first file. There is a second segment tree 326 having an L6 segment 331 and representing a second file.

Two or more files may share a same segment. A lower level segment may be referenced by one or more upper level segments. For example, a lower level segment may be referenced by a first upper level segment, and a second upper level segment. The first upper level segment may be from a first segment tree representing a first file. The second upper level segment may be from a second segment tree representing a second file. An upper level segment may reference one or more lower level segments. For example, an upper level segment may reference a first lower level segment and a second lower level segment.

In the example shown in FIG. 3, L6 segment 330 references L5 segments 340, 341 as shown by arrows 332, 333 from L6 330 to L5 340, 341, respectively. L6 segment 331 references L5 segment 342 as shown by an arrow 334 from L6 331 to L5 342. L5 segment 340 references an L1 segment 350 as shown by an arrow 343 from L5 340 to L1 350. L5 segment 342 references L1 segments 351, 352 as shown by arrows 344, 345 from L5 342 to L1 351, 352, respectively. L5 segment 341 references L1 segment 351 as shown by an arrow 346 from L5 341 to L1 351. The arrows from the L5 to L1 segment level are shown in broken lines to indicate that there can be other intermediate levels between the L5 and L1 levels.

L1 segment 351 references L0 segments 360, 361 as shown by arrows 353, 354 from L1 351 to L0 360, 361, respectively. L1 segment 350 references L0 segments 362, 363 as shown by arrows 355, 356 from L1 350 to L0 362, 363, respectively. L1 segment 352 references L0 segments 361, 363 as shown by arrow 357, 358 from L1 352 to L0 361, 363, respectively.

In a specific embodiment, an upper level segment includes a fingerprint of fingerprints of one or more lower level segments referenced by the upper level segment. For example, L6 segment 330 includes a finger of fingerprints of L5 segments 340, 341. L6 segment 332 includes a fingerprint of fingerprint of L5 segment 342. L5 segment 340 includes a fingerprint of fingerprint of L1 segment 350. L5 segment 342 includes a fingerprint of fingerprints of L1 segments 351, 352, and so forth.

It should be appreciated that the deduplicated file system namespace example shown in FIG. 3 is different from namespaces that may be provided and managed by the operating system kernel. For example, some operating systems such as Linux provide for partitioning kernel resources through namespaces such that one set of processes sees one set of resources while another set of processes sees a different set of resources. Some of the different types of Linux namespaces include the mount namespace, process ID namespace, network namespace, interprocess communication namespace, UNIX time-sharing (UTS) namespace, user namespace, control group namespace, and time namespace. Each non-username space may belong to a user namespace. User namespaces allow for isolation and sandboxing of applications and processes.

As shown in the examples of FIGS. 2 and 3, a deduplicated file system, unlike other non-deduplicated distributed file systems, must perform a number of additional operations and generate and maintain a considerable amount of metadata (e.g., fingerprint index) to help limit the amount of redundant data that is stored. As a result, there are long existing problems associated with maintaining the availability of a deduplicated file system while also providing high deduplication ratios. In a two-controllers HA system or a multi-nodes cluster system, the deduplication file system failover time is too long, e.g., requiring about 10 to about 20 minutes. This lengthy recovery time often results in backup clients timing out during failover and thus impacts to a customer's business.

There are technical challenges involved with reducing recovery and failover time. In particular, it is difficult to achieve a real distributed file system while satisfying requirements for a high deduplication ratio plus high performance. A deduplicated file system requires very large index buffers for the data fingerprints. To achieve extreme high performance, it is not feasible to go across nodes for index search and other deduplication operations. Deduplication is extremely sensitive to memory access latency. Currently, no product can achieve fast failover while also supporting the following features in a cost effective way: 1) Very high deduplication/compression ratio (e.g., greater than 60×); and 2) Extremely high performance (e.g., ingest greater than 10 gigabytes per second (GB/s) over NFS/CIFS. Existing products do not support a distributed file system with fast failover and high deduplication ratios and performance.

FIGS. 4 and 5 show examples of failover in a deduplicated file system. FIG. 4 shows a first state before failover. FIG. 5 shows a second state after the failover. As shown in the example of FIG. 4, there are multiple file system instances 410A-N running on multiple cluster nodes 415A-N, respectively, of a cluster. There is a storage pool 420 shared by all file system instances. There is a global name space 425 across file system instances. In an embodiment, the file system instances including deduplication domains are separate. This helps to ensure high performance and a good deduplication ratio inside each deduplication domain. In an embodiment, global deduplication is achieved by background working threads such as garbage collection (GC).

Generally, a computer processes information by loading data and programs from storage (e.g., hard disk drives) into local or main memory (e.g., random access memory (RAM)). The memory provides the central processing unit (CPU) with very fast access to the instructions and data that have been loaded from storage. The read/write speed of such memory is typically several times faster than a mass storage device, such as a hard disk (HDD) or even solid state drive (SSD). Typical memory, however, is volatile. Events such as power failures, crashes, and restarts can cause a loss of the contents being held in memory.

Thus, it takes time to failover a file system instance to another node or recover a file system instance by restarting it from the storage pool. In the example shown in FIG. 5, first node 415A has become unavailable as indicated by an "X." As a result, an instance 410A of the file system that had been hosted by the first node needs to be restarted on second node 415B. The restarting, however, requires an extensive number of hard disk drive (HDD) input/output (IOs) to the storage pool for recovering file system metadata (e.g., fingerprint index). HDD IOs are very slow and do not provide for fast file system recovery.

Figure 6:
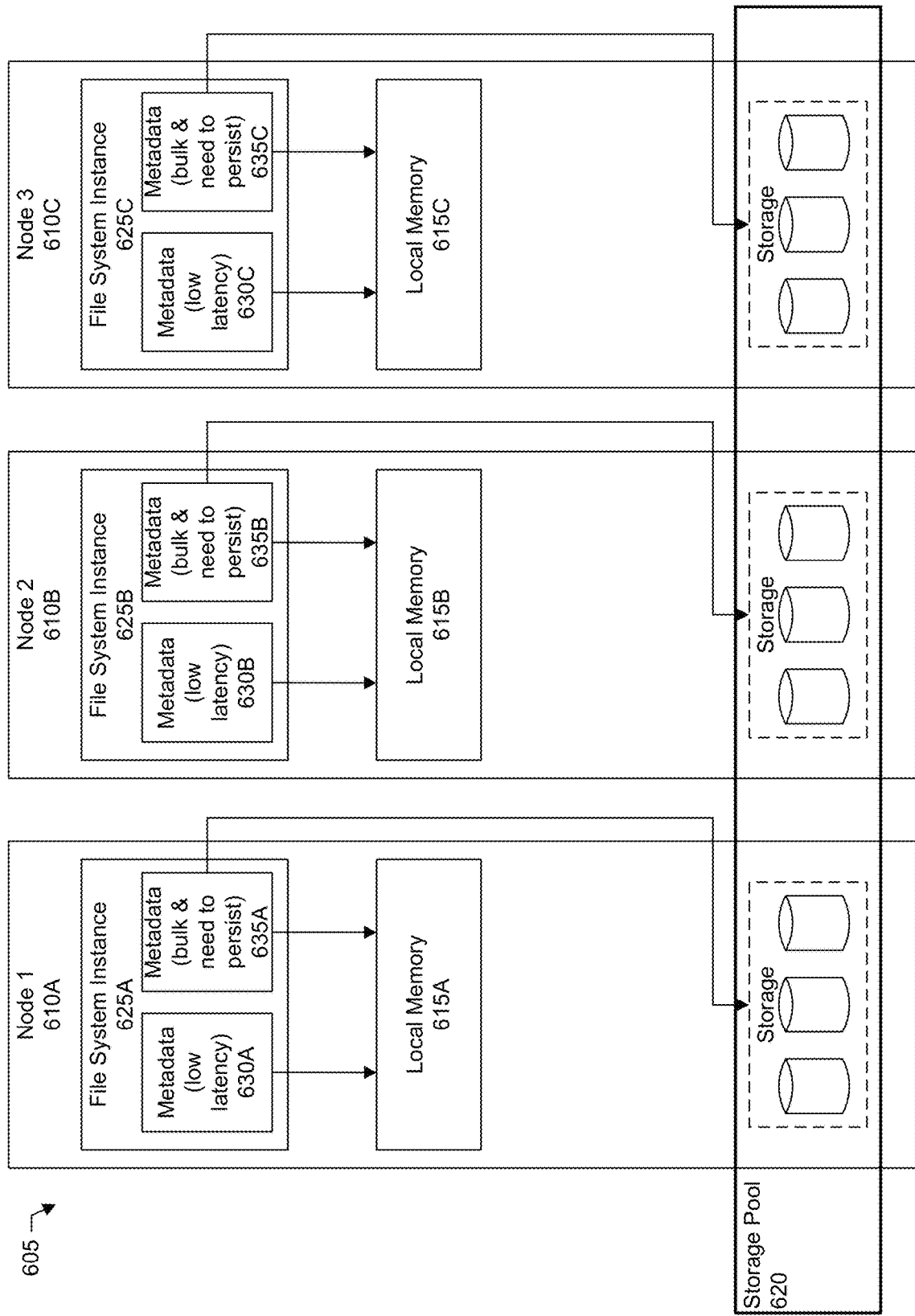
FIG. 6 shows another example of an architecture of a deduplicated file system, according to one or more embodiments.
Figure 7:
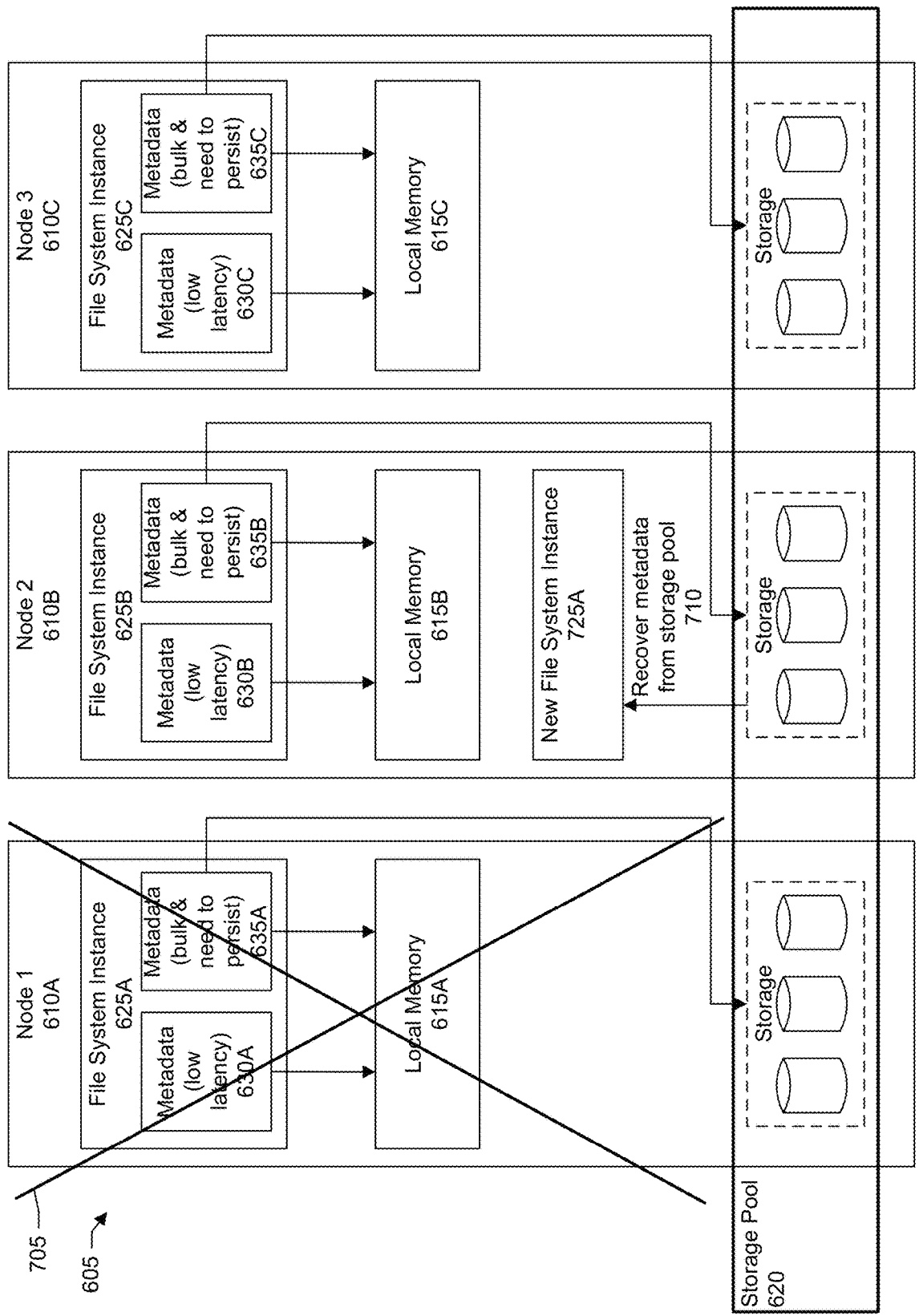
FIG. 7 shows another example of a failover of the deduplicated file system, according to one or more embodiments.

FIGS. 6-7 show examples of failover in a deduplicated file system in further detail. FIG. 6 shows a first state before failover. FIG. 7 shows a second state after the failover. As shown in the example of FIG. 6, a cluster 605 includes nodes 610A-C, local memory 615A-C on each node, respectively, and a storage pool 620 having any number of storage devices (e.g., hard disk drives) and accessible to each node of the cluster. The nodes host respective instances 625A-C of the deduplicated file system. As discussed, a deduplicated file system requires a considerable amount of metadata to conduct deduplication operations. Some metadata portions 630A-C, such as the fingerprint index, are especially critical such that low latency is highly desirable to ensure good file system performance. Other metadata portions 635A-C may be referred to bulk metadata to persist.

In a cluster, the file system operates on regular volatile memory and the storage pool. During a failover, performance of the file system is greatly impacted because of the long latency of accessing the storage pool.

In FIG. 7, for example, first node 610A has suffered a failure 705. As part of the failover process, first instance 625A of the file system that was being hosted by the first node is being restarted as new instance 725A on another node of the cluster, e.g., second node 610B, in order to recover file system services. It is a very slow process to recover metadata 710 from the storage pool. It takes a long time to reload metadata from the storage pool in order to recover the file system service.

In other words, depending on the type of failure, the file system may need to be restarted/recovered locally or on another cluster node. A file system crash may be the result of a previous cluster node crashing due to software or hardware faults. It requires a substantial amount of time for the file system to access the storage pool (e.g., HDDs) to recover metadata. The required time for a crash recovery startup of the file system can range from 10 to about 20 minutes. Major time consuming activities include replaying metadata from the hard drives and recovering metadata including fingerprint index. The required time due to maintenance of the high availability infrastructure can range from 3 to about 20 minutes. Major time consuming activities include enclosure/drive firmware upgrade, volume/RAID unassembled/reassemble, and resource release and reconfigure.

In an embodiment, a deduplication file system maintains an extremely large index buffer holding the data fingerprints in order to quickly deduplicate incoming data from the clients. Consider as an example, an incoming 100 GB or even 1 TB file. The file is split or divided into smaller data segments. In an embodiment, the segments are about 8 KB. A fingerprint, such as a SHA1 hash, is computed for each 8 KB segment. A 1 TB file would thus have 125 million fingerprints. These fingerprints are compared to the fingerprints in the index to determine whether or not a particular data segment already exists or is new. New data segments are stored and the fingerprint index is updated with the new fingerprints of the newly stored data segments. The process continues to repeat with later incoming new files or new versions of the files. Thus, the fingerprint index can grow very large as the storage pool continues to grow with data. A copy of the fingerprint index is stored to disk (e.g., storage pool). A copy is also held in memory so that new incoming fingerprints can be quickly compared with the index in memory to find out whether a particular data segment is unique and should be stored or is not unique and does not have to be again stored.

In an embodiment, each node of a cluster deduplicates independent of another node of the cluster. That is, a node does not go across to another node for deduplication. This allows for achieving high performance as even low-latency networking techniques such as remote direct memory access (RDMA), still have undesirably high latencies for purposes of deduplication in real time. In an embodiment, each file system instance of the deduplicated file system maintains a fingerprint index memory buffer to avoid going across nodes for the search index.

Thus, these are some of the challenges when attempting to support a fast failover of a deduplicated file system. When moving a file system service from one node to another node, there can be extremely large index buffer of fingerprints to also failover. Typical distributed file systems without deduplication do not have such challenges because there is no index buffer of fingerprints to search. In a deduplicated file system, fetching the required metadata from the storage pool can require an undesirably long amount of time because hard drive access is much slower than memory access.

Depending on the client protocol, in many cases a client will timeout or disconnect before a failover is complete. Restarting a deduplicated file system from the shared storage can require 20 minutes or more to complete as there are a number of settings to reinitialize. The DD Boost protocol provides for automatic retries if the HA failover completes within 10 minutes and reconnects automatically. For NFS, clients timeout within about 10 minutes. The exact time depends on OS and application. For CIFS, client wait 45 seconds for a response to any SMB command and automatic retry depends on OS and application. For virtual tape library (VTL), clients may timeout between 1 to about 30 minutes depending upon OS and application. For virtual disk (vDisk), the behavior depends on fiber channel (FC) or TCP/IP layer timeout settings. Reconnection can require manual intervention. That is, a timeout can require a user to manually reconnect the client to the cluster and file system and thus can be very disruptive.

To reduce the file system restart/recovery time, it is desirable to reduce or minimize the need for accessing HDDs during file system restart/recovery. It is desirable to reduce the latency time for transferring file system metadata into main memory. It is desirable to be able to quickly restart an instance of the file system so that a client does not suffer a timeout.

Figure 8:
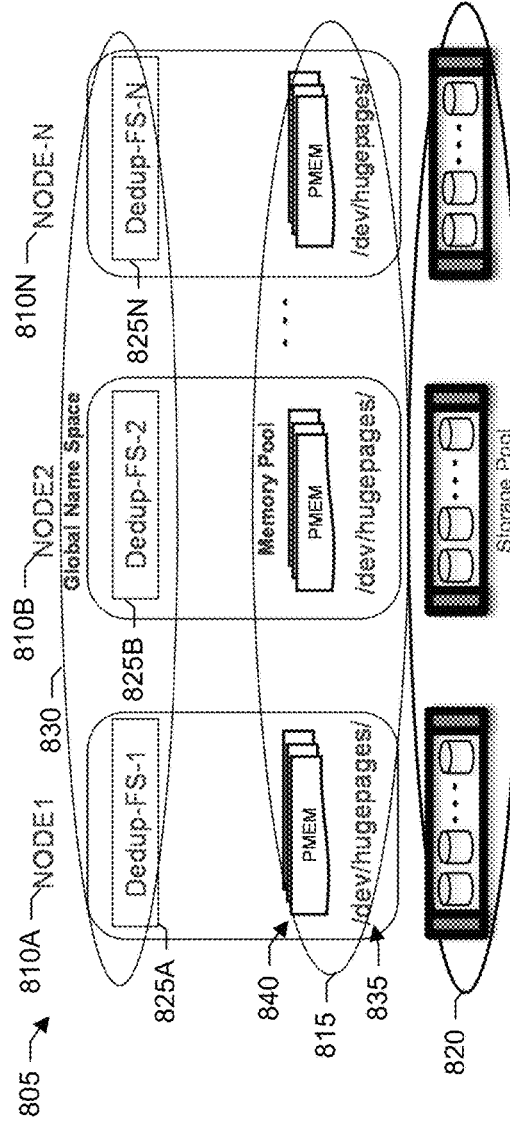
FIG. 8 shows an architecture of a deduplicated file system having memory tiers to support a fast failover, according to one or more embodiments.
Figure 9:
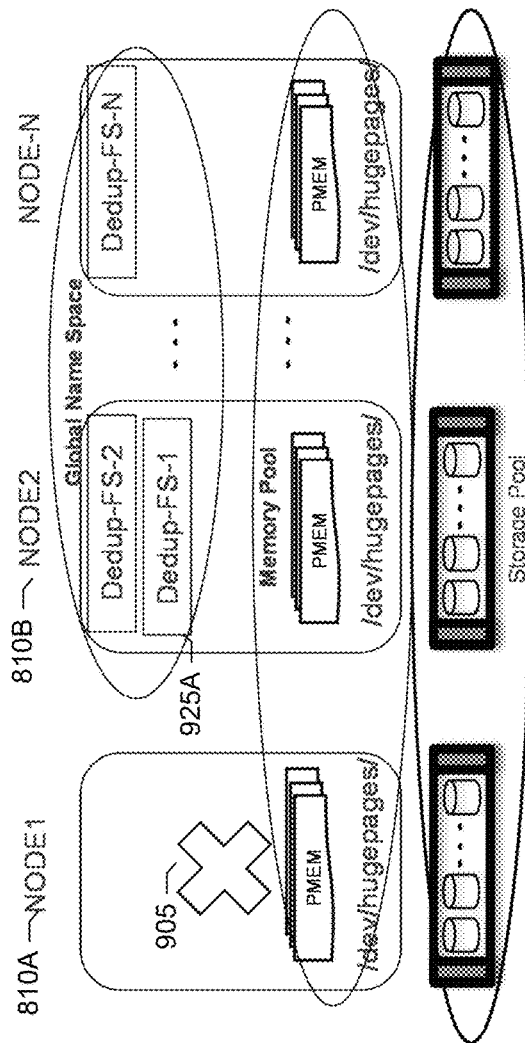
FIG. 9 shows an example of a failover of the deduplicated file system shown in FIG. 8, according to one or more embodiments.

FIGS. 8-9 show examples of failover in a deduplicated file system in which systems and techniques are provided for a fast restart and recovery of file system services. Embodiments allow for reducing failover time from about 10 to 20 minutes to about 2 to 5 minutes. Such systems and techniques may be applied in a two-controller HA cluster or N-node cluster failover environment. FIG. 8 shows a first state before failover. FIG. 9 shows a second state after the failover.

As shown in the example of FIG. 8, a cluster 805 includes nodes 810A-N, a memory pool 815 with first and second memory layers, caches, or tiers 835, 840, respectively, in each node, and a storage pool 820 having any number of storage devices (e.g., hard disk drives) accessible to each node of the cluster. The first and second memory tiers are in addition to main memory that may be present locally in each node.

The nodes host respective instances 825A-N of the deduplicated file system. A global namespace 830 is collectively supported by the file system instances. In other words, although there are separate instances of the file system, the clients outside of the cluster that are accessing the file system are presented with a single global namespace. The global namespace is a thin layer that during file access requests from the clients accepts filenames, consults a file directory catalog, and then dispatches the file access requests to the appropriate node. Each node is responsible for a particular portion of the namespace and deduplication is performed within a particular node rather than across nodes.

The first memory tier includes memory (e.g., RAM or volatile memory) configured as huge pages. Paging is a memory management technique where virtual memory is used to expand the amount of main memory (e.g., RAM) available to processes. In paging, a portion of storage is allocated to virtual memory where processes or other data may be stored in pages and then moved back into main memory when needed. A page table is maintained that provides a mapping between the virtual and physical address spaces (e.g., mapping between page numbers in virtual memory and frame numbers in physical memory). To facilitate performance, a memory cache referred to as a translation lookaside buffer (TLB) may be used to store recent translations of virtual memory to physical memory.

More particularly, memory addresses that may be used by a program are referred to as virtual addresses. With virtual memory management, virtual addresses are mapped into physical addresses in physical memory. Main storage as seen by a process or task appears as a virtual address space that is a logically contiguous address space or collection of contiguous segments. The operating system manages virtual address spaces and the assignment of real memory to virtual memory. Address translation hardware in the CPU, often referred to as a memory management unit (MMU), automatically translates virtual addresses to physical addresses. Software within the operating system may extend these capabilities to provide a virtual address space that can exceed the capacity of real memory and thus reference more memory than is physically present in the computer.

Thus, when a program is executing and references a virtual address, processing may be performed by the operating system to translate the virtual address into a physical address location of memory including the referenced code or data. If the referenced code or data is not currently stored in memory, a page fault occurs and the referenced content is loaded, for example, from a storage device, into memory.

With virtual memory, the virtual address space of an application may be partitioned into contiguous portions each referred to as a page. Thus, each virtual address may be represented as a page number and a location or offset within that page. A page table is a data structure that maybe used by the operating system where the page table stores the mappings of virtual addresses to physical addresses. Each mapping may correspond to a row or entry in the table also known as a page table entry (PTE).

The CPU's memory management unit may store the recently used mappings from the operating system's page table in a cache. The cache of page table mappings may also be referred to as a translation lookaside buffer (TLB).

Thus, when a virtual address needs to be translated into a physical address, the TLB is searched first to determine whether the PTE or mapping is in the TLB. If a match is found thereby resulting in a TLB cache hit, the physical address corresponding to the virtual address is returned and memory access can continue. However, if there is no match thereby resulting in a TLB miss, an exception may occur resulting in an exception handler being invoked. The handler typically looks up the address mapping for the virtual address of interest in the page table (often referred to as a page table walk) to see whether a mapping exists. If so, the mapping may be written or cached in the TLB, and the faulting instruction is restarted to again reference the virtual address. On this subsequent reference to the virtual address, the TLB is again searched and this time results in a TLB hit, and the memory access continues. Each TLB entry also maps a single page of virtual address space to physical memory.

Memory pages are typically 4 KB in size. In an embodiment, huge pages refers to virtual memory pages of large sizes, e.g., greater than 4 KB. Operating systems, such as Linux, provide support for large page sizes, e.g., 2 MB page sizes, 256 MB page sizes, or even 1 GB page sizes. Such pages may be referred to as huge pages, large pages, or HugeTLB memory pages.

Writes to huge pages, e.g., HugeTLB memory pages, are exported to a device file (e.g., /dev/hugepages/) that is outside of the file system process. That is, the device file is in a namespace separate from the file system process. This means that should the file system process crash, the data written to the HugeTLB memory pages remains available so long as the node itself, e.g., operating system kernel or hardware, remains operational. In other words, rather than directly keeping file system metadata inside the file system process, the metadata is instead or additionally moved to /dev/hugepages/ and is accessed as files or device files.

In an embodiment, device files are located in the /dev directory and managed by the operating system kernel. The /dev directory is an integral part of the root (/) file system because these device files must be available to the operating system during the boot process. Device files provide applications and the operating system with an interface to the devices that they represent. In other words, a device file is an interface for a device driver that appears in a file system as if it were an ordinary file. A device driver is a program that controls a particular type of device. During a write, data may be passed from the application or operating system to the device file which then passes it to a device driver which then sends it to the physical device. During a read, the data path is reversed, e.g., from the physical device through the device driver to the device file, and then to the application. A device file can represent character devices, which emit a stream of data one character at a time, or block devices which allow random access to blocks of data. Device files allow user programs to access hardware devices on the system through the kernel. In an embodiment, file system metadata including a fingerprint index, is written to HugeTLB memory pages and exported to a device file representing a block device.

Writing at least a portion of the deduplicated file system metadata (e.g., fingerprints) to huge pages and exporting as a device allows the metadata to be maintained separately from the file system namespace. In particular, deduplication operations of the file system reside in the user space or are user processes. A crash of the user space typically results in the loss of file system data including metadata. However, by saving the metadata to a separate device, the metadata remains accessible from the device memory after a crash of the file system process. An instance of the file system can then be started or restarted by loading from the device file rather than loading from the hard disks of the storage pool.

Thus, while HugeTLB memory pages uses memory that is volatile, writes to such memory pages are available and accessed using a device file that is outside the user or user process namespace having the deduplicated file system process. Should the deduplicated file system process crash, all memory buffers in that user space that crashed will be lost. Upon restart and allocation of a new memory buffer, the new memory buffer will not contain the original data or metadata. By placing the metadata into the device file, however, the metadata remains accessible after the process or user namespace crash. A new instance of the deduplicated file system can be started by loading metadata from the device file rather than having to load from the hard disks of the storage pool. Thus, exporting to a device file by writing the file system metadata to huge memory pages helps to isolate the metadata from the user namespace containing or associated with the deduplicated file system process.

The second memory tier includes persistent memory (PMEM) devices. Persistent memory is a type of flash memory, but in the form factor of a dual in-line memory module (DIMM). Persistent memory is a byte-addressable class of non-volatile storage offering low latency and caching abilities. Persistent memory does not lose data when there is a power failure. Latency of persistent memory is slightly higher than that of dynamic random access memory (DRAM), but the storage capacity of a PMEM chip is much greater than that of a DRAM chip. This can allow for a large portion, most, or even all file system metadata to be persisted to the second memory tier using persistent memory. Such metadata may include, for example, binary tree data structures tracking the disk locations of data segments making up the files.

Persistent memory, which is byte-addressable, differs from other types of nonvolatile storage, such as disk drives that are block addressable. Persistent memory is also much faster than HDDs and SSDs. Persistent memory is also different from non-volatile random access memory (NVRAM) in that persistent memory may be connected to the CPU by a memory bus whereas NVRAM may be connected to a motherboard backplane as a peripheral expansion bus. NVRAM size may also be limited to 8 GB. Thus, only a small portion of file system metadata may be persisted to a NVRAM device; and after a file system crash, it can take a long time to scan disks of the storage pool to recover all the metadata.

Some examples of PMEM devices include Intel® Optane™ as provided by Intel Corporation of Santa Clara, California; and Dell Cache-To-Flash as provided by Dell Technologies of Round Rock, Texas. The device size of a PMEM device such as Optane is much larger (e.g., 128-512 GB per single DIMM) than DRAM. This allows for persisting a large amount of file system metadata to a large PMEM device thereby reducing the need to access the disks of the storage pool for recovery.

In an embodiment, a fast restart/recovery of a deduplicated file system in a cluster environment is provided by persisting some file system metadata using large persistent memory devices, holding the rest of file system metadata to HugeTLB pages, building a memory pool across cluster nodes (such as through mirroring or erasure coding), or combinations of these. Most (if not all) file system metadata may be held by the memory pool across cluster nodes. In a large data protection system, there could be more metadata in memory than the size of a PMEM device. In addition to PMEM devices, a system may also use HugeTLB memory pages to hold metadata. So most (if not all) file system metadata may either be persisted in the PMEM devices, held by HugeTLB memory pages, or both.

In an embodiment, the memory pool includes a hierarchical arrangement of the first and second memory layers or tiers. The memory pool may be built using mirroring, erasure coding, or both. Metadata generated by the file system including, for example, fingerprint indexes listing fingerprints of segments stored by the file system, and tree data structures having information tracking a location of the segments, is written to the storage pool. With the memory pool one or more nodes of the cluster may have a copy of metadata generated or maintained in local memory of other particular nodes of the cluster.

For example, a first fingerprint index of a first node of a cluster may be written to a first memory tier (e.g., memory using huge pages) local to the first node. To create the memory pool, the first fingerprint index may be written to first memory tiers of each other node in the cluster. Likewise, the fingerprint index of each of the other nodes may be written to the first memory tier of the first node.

The memory pool may be built across cluster nodes via a remote direct memory access (RDMA) interconnection. A 1-to-1 mirror may be used for a two-nodes HA cluster. Erasure coding may be used for an N-nodes cluster.

The architecture shown in the example of FIG. 8 can handle many different failure scenarios. The architecture supports a fast restart/recovery of the file system from a local node. In the case of file system crashes but no kernel or hardware crashes, file system metadata can be recovered from local PMEM and HugeTLB pages.

The architecture can also support a fast restart/recovery of the file system from another cluster node. In the case of cluster node crashes due to kernel or hardware issues, file system metadata can be recovered from the memory pool. In both cases, the need to access hard disk drives from the storage pool for recovering the file system is minimized or reduced.

In other words, a scenario may include the user space file system crashing, but no kernel or hardware crash. In this case, the file system can be quickly started or restarted by recovering file system metadata from local persistent memory and HugeTLB. Since the node remains available, there is no need to recover on another node. Another scenario may include the node crashing such as due to a kernel panic or hardware failure on the node. In this case, the node may be unavailable. Thus, the file system instance may be started or restarted on another node by recovering the file system metadata from the memory pool. For both scenarios, not having to recover or load the file system metadata (e.g., fingerprint index) from the hard disks of the storage pool allows for a very fast restart of the file system.

In other words, if a file system instance on a particular node fails, but the particular node remains available, the file system instance can be restarted by loading the file system metadata from the local memory of the particular node. If, however, the file system instance fails because the particular node has failed and remains unavailable, the memory pool allows another node to recover the portion of the metadata generated or maintained in local memory of the failed node. Thus, while each node may deduplicate independent of another node using a particular fingerprint index, the fingerprint index (and tree data structures) of each node may be mirrored to other nodes of the cluster to support recovery of file system metadata.

Using persistent memory devices with large sizes to persist file system metadata, allows for achieving much faster restart/recovery speeds for a deduplicated file system because of the reduction in need to read the hard disk drives of the storage pool.

Likewise, using HugeTLB pages outside of the file system process to hold more file system metadata, further minimizes or reduces HDD IOs to the storage pool, thereby further speeding up the restart/recovery of the deduplicated file system.

Building a memory pool across cluster nodes with PMEM, HugeTLB pages, or both allows the deduplication file system to be restarted/recovered from another cluster node without sacrificing failover time.

In an embodiment, there is both a first memory tier using huge pages, a second memory tier using PMEM devices, and a memory pool built across the cluster nodes. The first memory tier using huge pages may be faster (e.g., offer lower latency) than the second memory tier using PMEM devices. The second memory tier may offer greater capacity than the first memory tier. For example, the first memory tier may have a 100 GB capacity. The second memory tier may have a 2 TB capacity. Upon the first memory tier reaching full capacity, older pages may be evicted to the second memory tier.

In an embodiment, different types of file system metadata may be kept in the different tiers. The first memory tier using huge pages may hold a first portion of the metadata. The second memory tier using PMEM devices may hold a second portion of the metadata.

The first portion of the metadata may include performance critical metadata such as the fingerprint index because of the frequency with which the fingerprint index is used when comparing newly incoming fingerprints. The second portion of the metadata may include less performance critical metadata such as a binary tree metadata that tracks data segments of a file, file system directory metadata used to build a structure of directories, or both. To balance available space and performance, the fingerprint index may be kept in the first memory tier, but not in the second memory tier. Although the capacity of the first memory tier using huge pages may be less than the capacity of the second memory tier using PMEM devices, the lower latency offered by the first memory tier can be exploited by keeping the fingerprint index in the first memory tier. Conversely, the larger capacity offered by the second memory tier using PMEM devices can be exploited by persisting the tree structures tracking locations of the files or file segments in the storage pool.

In an embodiment, a method includes: providing, across a cluster of nodes hosting a deduplicated file system, first and second memory tiers, the first memory tier using volatile memory and comprising memory pages configured as huge pages, wherein writes to the huge pages are exported in a device file that is outside of a user process namespace within which processes of the deduplicated file system run, and the second memory tier comprising persistent memory (PMEM) devices; building a memory pool comprising the first and second memory tiers; writing a first portion of metadata generated by the deduplicated file system to the first memory tier, the first portion of the metadata comprising an index of fingerprints corresponding to data segments stored by the deduplicated file system to a storage pool; writing a second portion of the metadata to the second memory tier, the second portion of the metadata comprising information tracking the data segments in the storage pool; determining that an instance of the file system has failed; when a node of the cluster hosting the instance remains available, restarting the instance on the node by recovering file system metadata from huge pages and PMEM devices that are local to the node; and when the node of the cluster is not available, restarting the instance on another node of the cluster by recovering the file system metadata from the memory pool.

In an embodiment, a method includes: constructing a memory tier in each node of a cluster of nodes hosting a deduplicated file system, the memory tier comprising at least one of persistent memory (PMEM) devices or memory configured as huge pages; generating fingerprints corresponding to data segments stored by the deduplicated file system; copying the fingerprints from main memory of a node to the memory tier; building a memory pool comprising the memory tier by mirroring the fingerprints local to the node to a remote corresponding memory tier constructed in each other node of the cluster of nodes; and restarting the deduplicated file system by reading the fingerprints from the memory tier.

In an embodiment, a method includes establishing, across a cluster of nodes hosting a deduplicated file system, a memory tier using memory configured as huge pages, wherein writes to the huge pages are exported to a device file that is outside of a user namespace within which processes of the deduplicated file system run; receiving a first file from a client for storage in a storage pool of the file system; deduplicating the first file, the deduplication resulting in a plurality of new segments to be stored; generating metadata comprising a new index of fingerprints corresponding to the new segments and a tree structure tracking a location at which the new segments are stored in the storage pool; moving the new index of fingerprints to the memory tier using memory configured as huge pages; moving the tree structure outside the memory tier using memory configured as huge pages; receiving a second file from the client, after the first file, for storage in the storage pool; and deduplicating the second file against at least the new index of fingerprints in the memory tier using memory configured as huge pages.

Some embodiments may not include both memory tiers or memory pool. For example, an embodiment may include the first memory tier, e.g., memory configured as huge pages, and not include the second memory tier, e.g., PMEM devices. An embodiment, may include the second memory tier, e.g., PMEM devices, and not include the first memory tier, e.g., memory configured as huge pages. An embodiment may include a huge pages memory tier with huge pages memory pool. An embodiment may include a PMEM memory tier with PMEM memory pool.

As another example, an embodiment may not include a cluster of nodes. Instead, there can be a single node hosting the deduplicated file system. A memory tier using at least one of persistent memory (PMEM) devices or memory using huge pages may be constructed in the node. Fingerprints may be generated corresponding to data segments stored by the deduplicated file system. The fingerprints may be copied from main memory of the node to the memory tier. If, for example, the file system should crash, but the node remains available, the file system can be quickly restarted on the node by reading the fingerprints from the memory tier.

In the example shown in FIG. 9, first node 810A has suffered a failure 905. In this example, as a part of the failover process, first instance of the file system that was being hosted by the first node is restarted as a new instance 925A on another node of the cluster, e.g., second node 810B, in order to recover file system services.

In an embodiment, during a restart of a file system instance, file system metadata is loaded into local memory of a node from at least one of the first or second memory tiers rather than loading the metadata from the hard disk drives of the storage pool. A memory tier or pool using huge memory pages, PMEM, or both offers much lower latency times as compared to loading from the hard disk drives of the storage pool.

Figure 10:
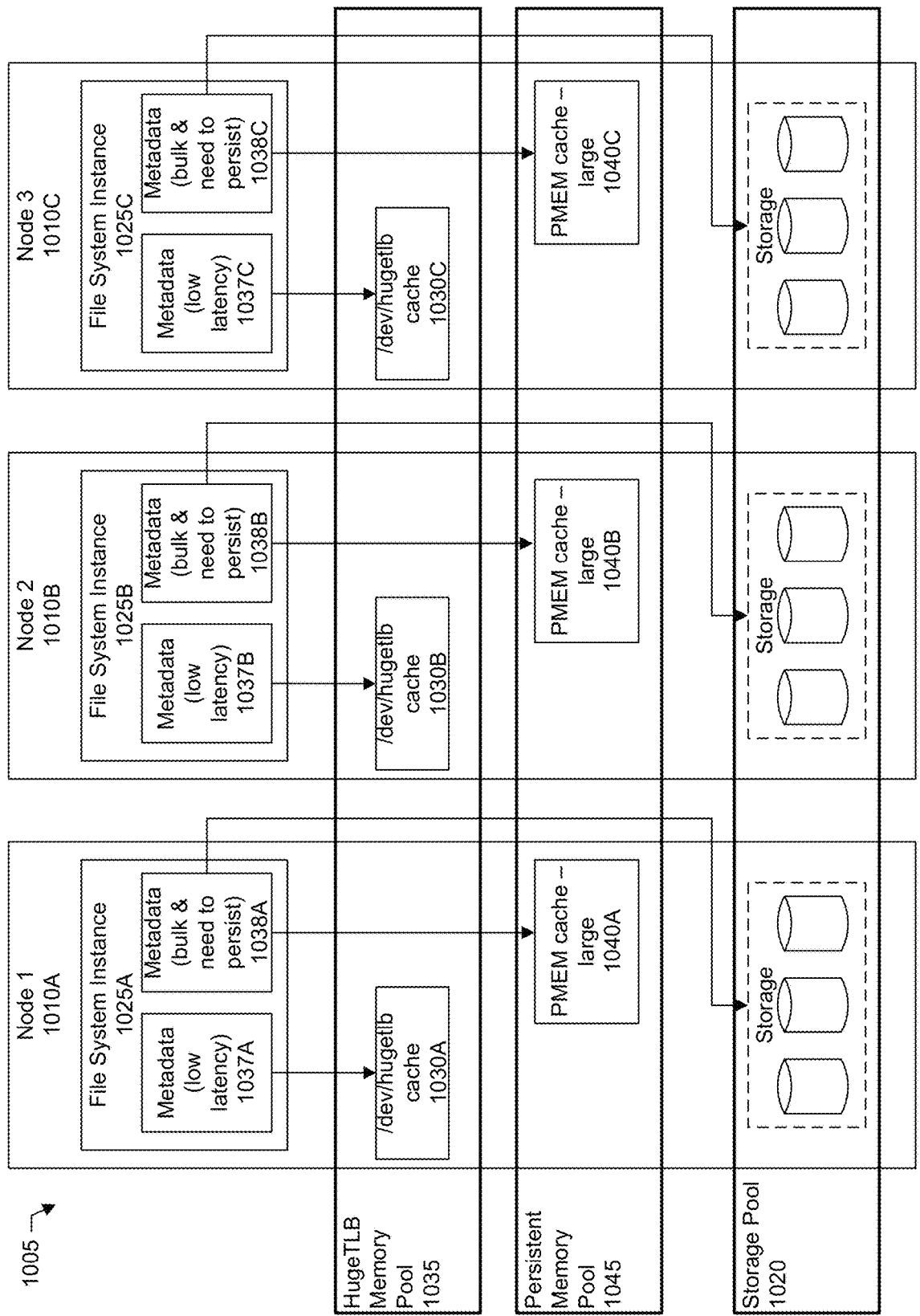
FIG. 10 shows another example of an architecture of a deduplicated file system having memory tiers to support a fast failover, according to one or more embodiments.

FIG. 10 shows further detail of an architecture of a deduplicated file system providing for a fast restart and recovery of file system services. In the example of FIG. 10, a cluster 1005 includes nodes 1010A-C and a storage pool 1020 accessible to the nodes. The nodes host instances 1025A-C, respectively, of the deduplicated file system. A first memory tier having memory configured as huge pages (e.g., HugeTLB memory pages) 1030A-C on respective nodes has been established as a first memory pool 1035 across the nodes. Metadata 1037A-C requiring low latency is written to the huge pages memory pool. A second memory tier having PMEM devices 1040A-C on respective nodes has been established as a second memory pool 1045 across the nodes. Metadata 1038A-C including bulk metadata to persist is written to the persistent memory pool. As shown in the example of FIG. 10, this architecture includes the addition of a HugeTLB memory pool and a PMEM pool. In an embodiment, the HugeTLB memory pool provides the lowest latency as compared to the persistent memory pool and maintains metadata when the file system crashes (while node is still alive). The persistent memory pool provides acceptable latency and maintains metadata even if the whole cluster loses power.

Figure 11:
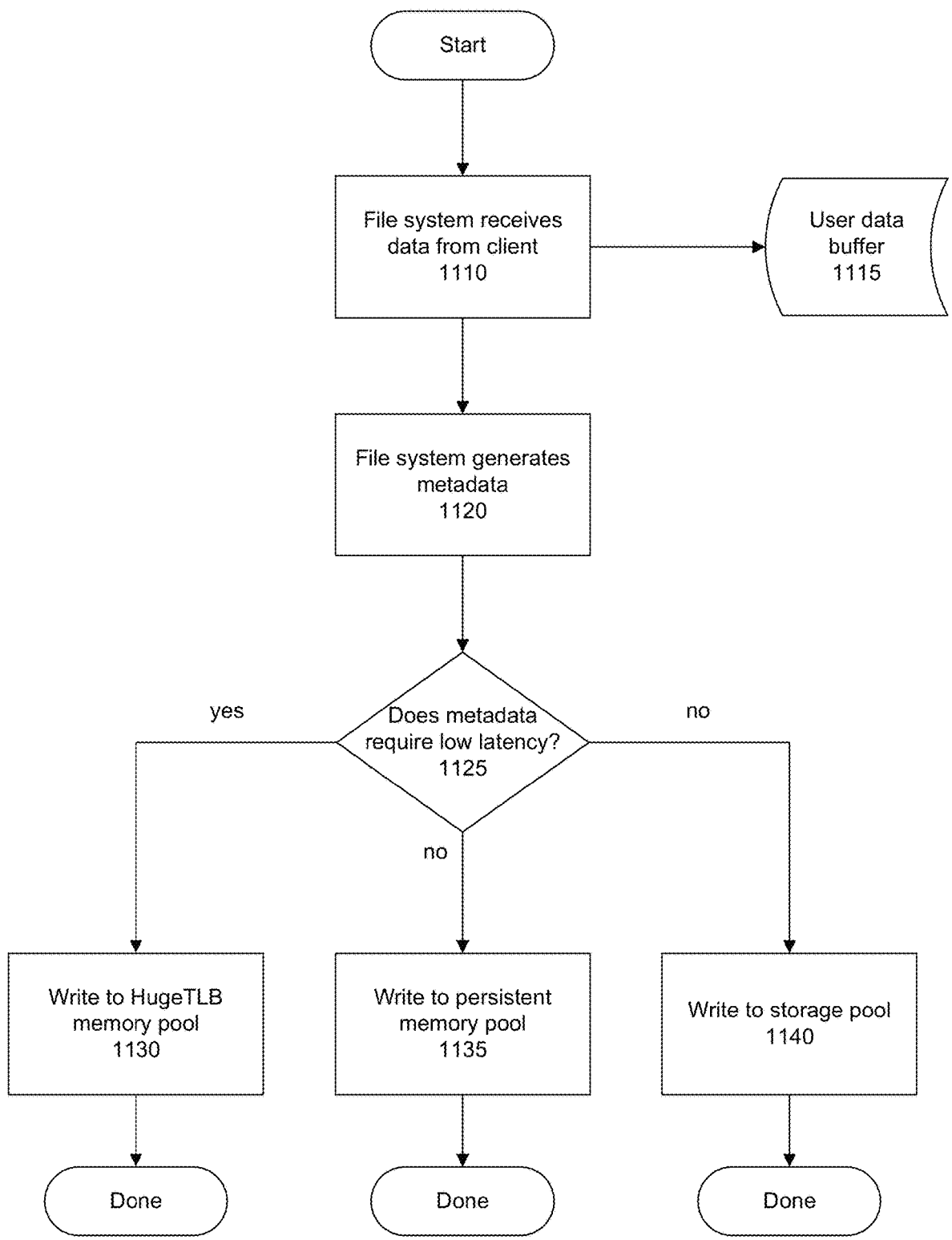
FIG. 11 shows an overall flow for writing file system metadata, according to one or more embodiments.

FIG. 11 shows a flow for providing a fast restart and recovery of file system services in a deduplicated file system. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 1110, the deduplicated file system receives data from a client. The data may include client files or segments of client files for backup. In a step 1115, the data may be placed in a user data buffer. In a step 1120, the file system generates metadata to track the segments. The metadata may include, for example, fingerprints of a fingerprint index corresponding to the segments, binary tree metadata to track data segments of the files, file system directory metadata for building the structure of directories, and other metadata.

In a step 1125, a determination is made as to whether the metadata requires low latency. In a step 1130, metadata requiring low latency is written from local main memory of a node to the HugeTLB memory pool. The metadata may additionally be written to the persistent memory pool.

In a step 1135, metadata not requiring low latency is written from the local main memory of the node to the persistent memory pool. In a step 1140, all metadata is ultimately written to the storage pool. For example, metadata may periodically be copied from HugeTLB memory, PMEM, or both to disk to provide further redundancy as the storage pool is protected by a RAID array.

As discussed, an example of metadata requiring low latency includes the fingerprint index because it may be frequently compared with newly incoming fingerprints during a backup operation. Maintaining the fingerprint index in the first memory tier (e.g., HugeTLB memory pool) allows for fast fingerprint comparisons during the backup operation to determine whether or not a data segment needs to be transmitted from the backup client for storage in the storage pool or not transmitted because the data segment already exists at the storage pool. Being a able to quickly compare fingerprints helps to reduce the amount of time required to conduct the backup operation. The fingerprint index may additionally be persisted to the second memory tier (e.g., PMEM tier). Persisting the fingerprint index to the second memory tier can facilitate recovery when the entire cluster experiences a power failure that causes the contents of the first memory tier to be lost.

An example of metadata not requiring low latency includes the binary tree metadata to track data segments of a file, and file system directory metadata used for building a structure of the directories. Thus, these types of metadata may be written to the second memory tier (e.g., persistent memory pool).

The flow shown in FIG. 11 is of an example of a data flow when there are no failures. In an embodiment, performance is optimized or improved because it takes less time to persist metadata to persistent memory pool of a large capacity than to persist to the storage pool. Once data is written to the persistent memory pool, file system can quickly respond to the client and be ready to receive the next data packet from the client.

Figure 12:
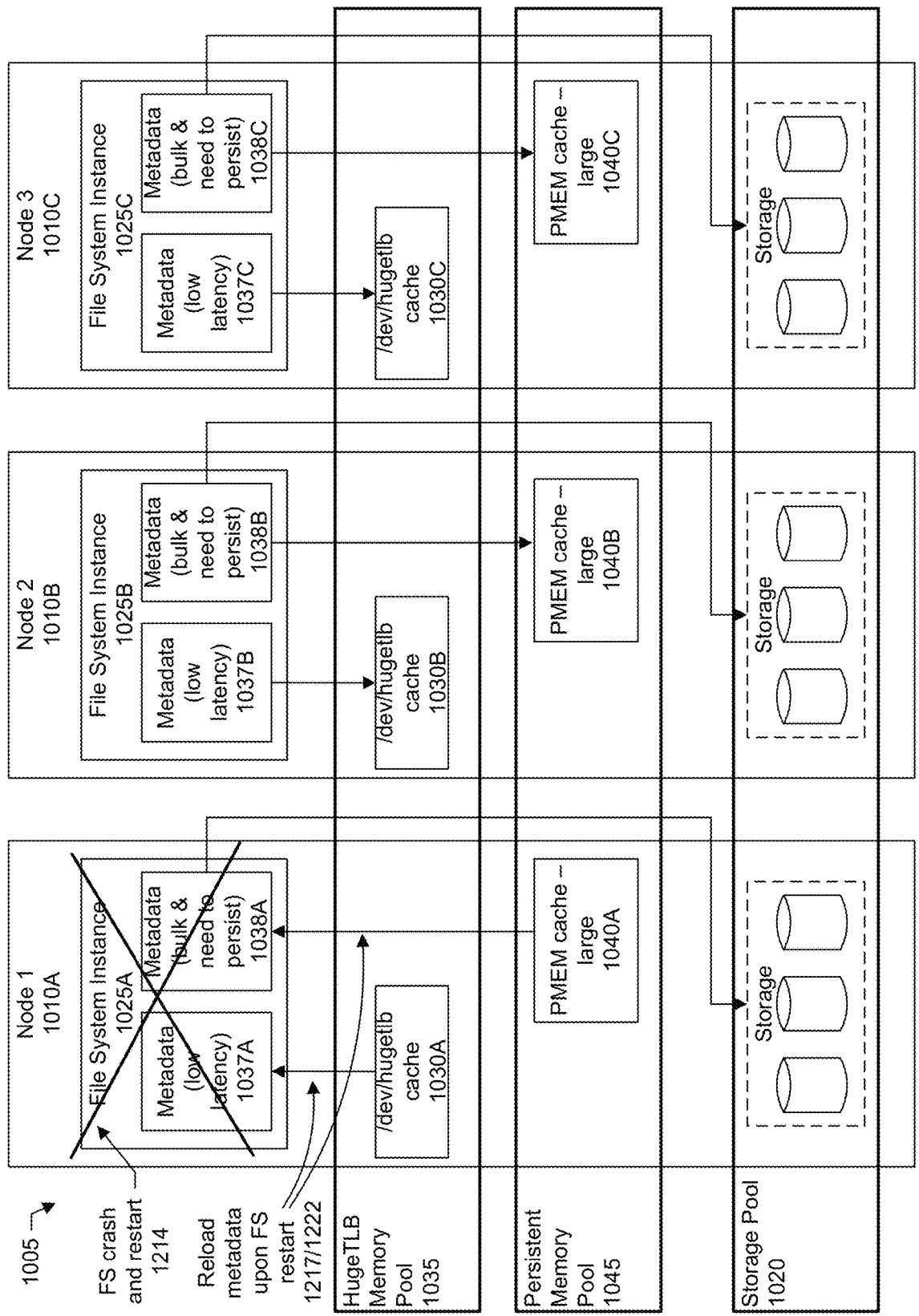
FIG. 12 shows an example of restarting an instance of the file system for the architecture shown in FIG. 10, according to one or more embodiments.

FIG. 12 shows an architecture of the deduplicated file system shown in FIG. 10 when there becomes a need to restart an instance of the file system. The architecture allows for a fast restart of the file system when the file system has crashed. In the example of FIG. 12, an instance of the file system on first node 1010A has crashed and needs to be restarted 1214.

After the file system crash, metadata is still available from local HugeTLB memory tier 1030A and persistent memory tier 1040A. The file system can quickly reload 1217, 1222 metadata from local memory to restart the file system service. More particularly, the file system does not have to load or access the metadata from the storage pool in order to restart the file system.

Figure 13:
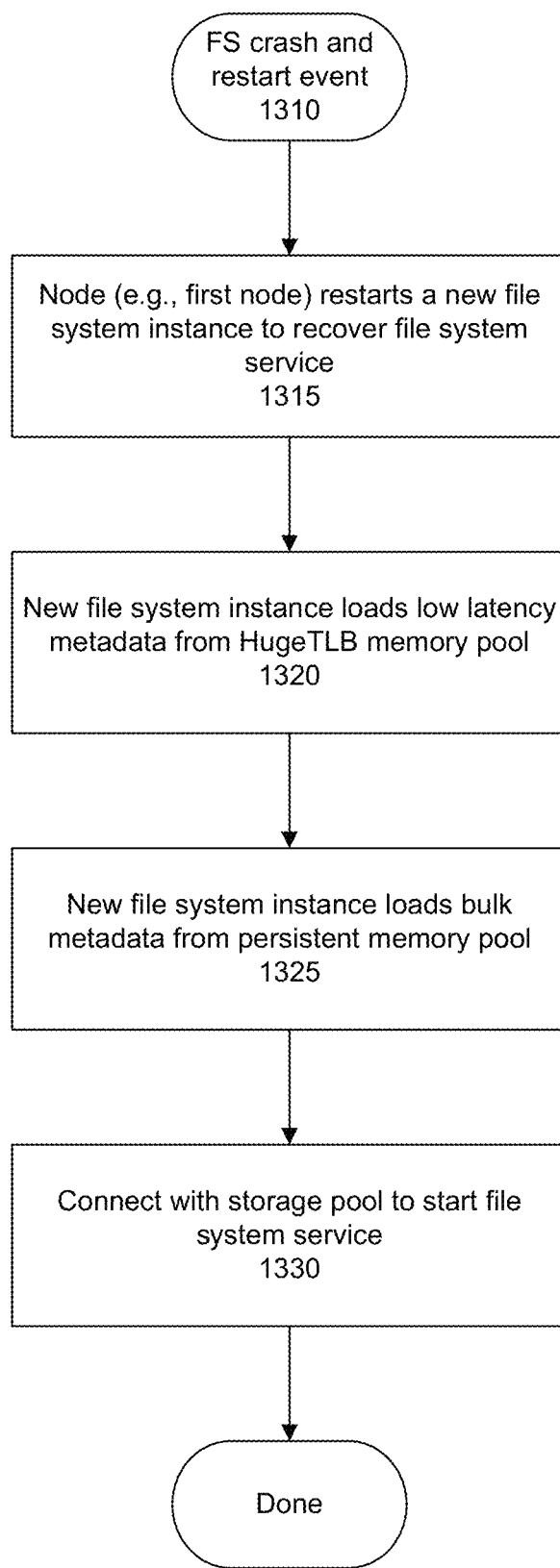
FIG. 13 shows an overall flow for restarting a new file system instance, according to one or more embodiments.

FIG. 13 shows a flow for a fast restart of the file system when the file system has crashed. In a step 1310, the file system has crashed and a restart event has been triggered. Consider, as an example, that the crash has occurred on first node 1010A (see, e.g., FIG. 12). In a step 1315, the node on which the file system has crashed (e.g., first node) restarts a new file system instance to recover the file system service. In a step 1320, the new file system instance loads low latency metadata from the HugeTLB memory pool (see, e.g., 1217, FIG. 12). In a step 1325, the new file system instance loads bulk metadata from the persistent memory pool (see, e.g., 1222, FIG. 12). In a step 1330, the new file system instance connects with the storage pool to start the file system service.

Figure 14:
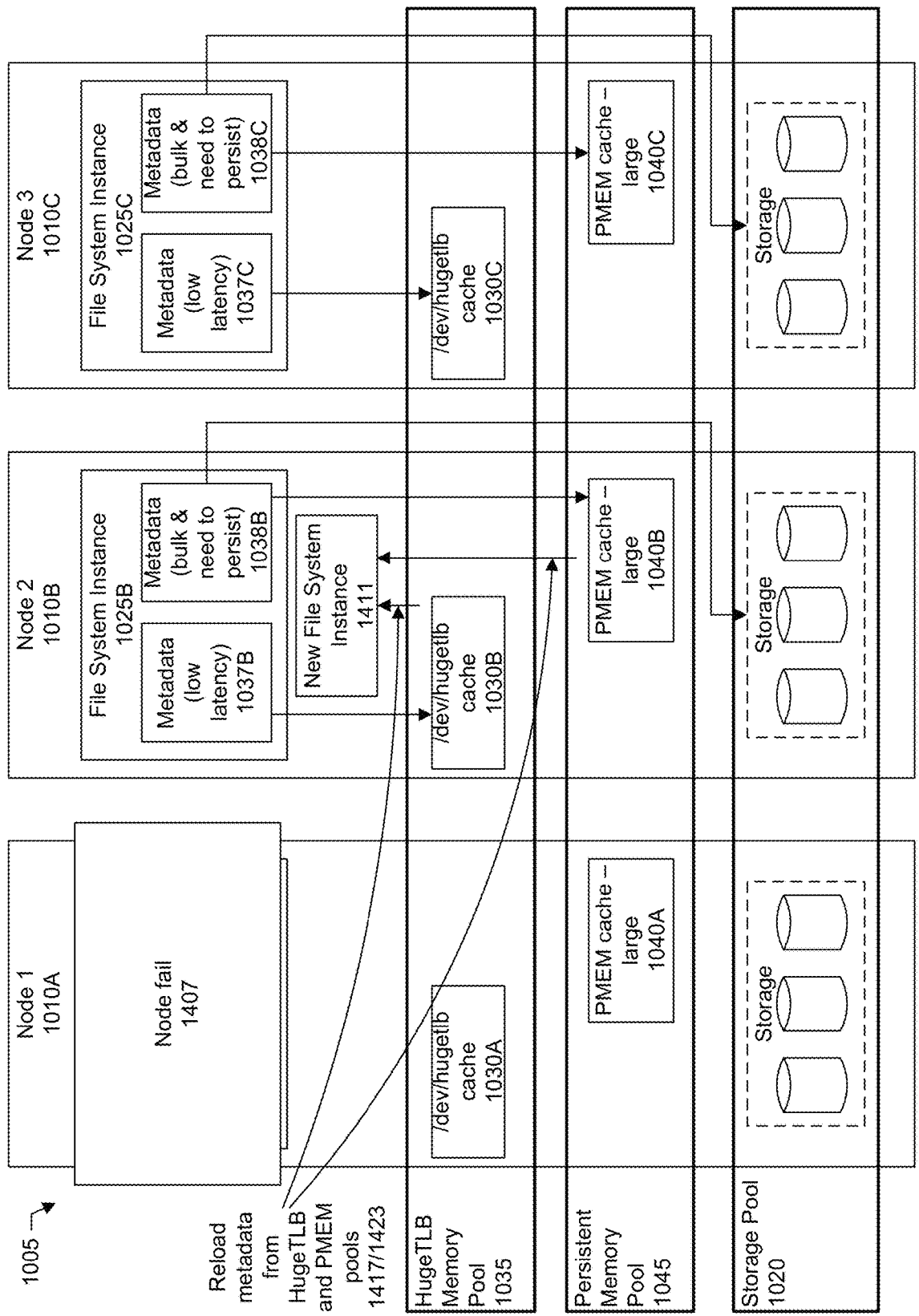
FIG. 14 shows an example of restarting an instance of the file system on a new node for the architecture shown in FIG. 10, according to one or more embodiments.

FIG. 14 shows an architecture of the deduplicated file system shown in FIG. 10 when a node has failed. The architecture allows for a fast failover of the file system to a different node of the cluster. In the example of FIG. 14, first node 1010A has failed 1407. The failure may be the result of, for example, a hardware malfunction on the first node, a crash of the operating system kernel on the first node, a power failure on the first node, or any other event that causes the first node to become unavailable.

Another different node of the cluster (e.g., second node 1010B) is able to restart a new instance of the file system 1411 and quickly reload 1417 metadata from HugeTLB memory pool 1035 and reload 1423 metadata from PMEM pool 1045. Loading metadata from the HugeTLB memory pool and PMEM pool—and not from the storage pool—allows for quickly restarting the failed file system service on the second node.

Figure 15:
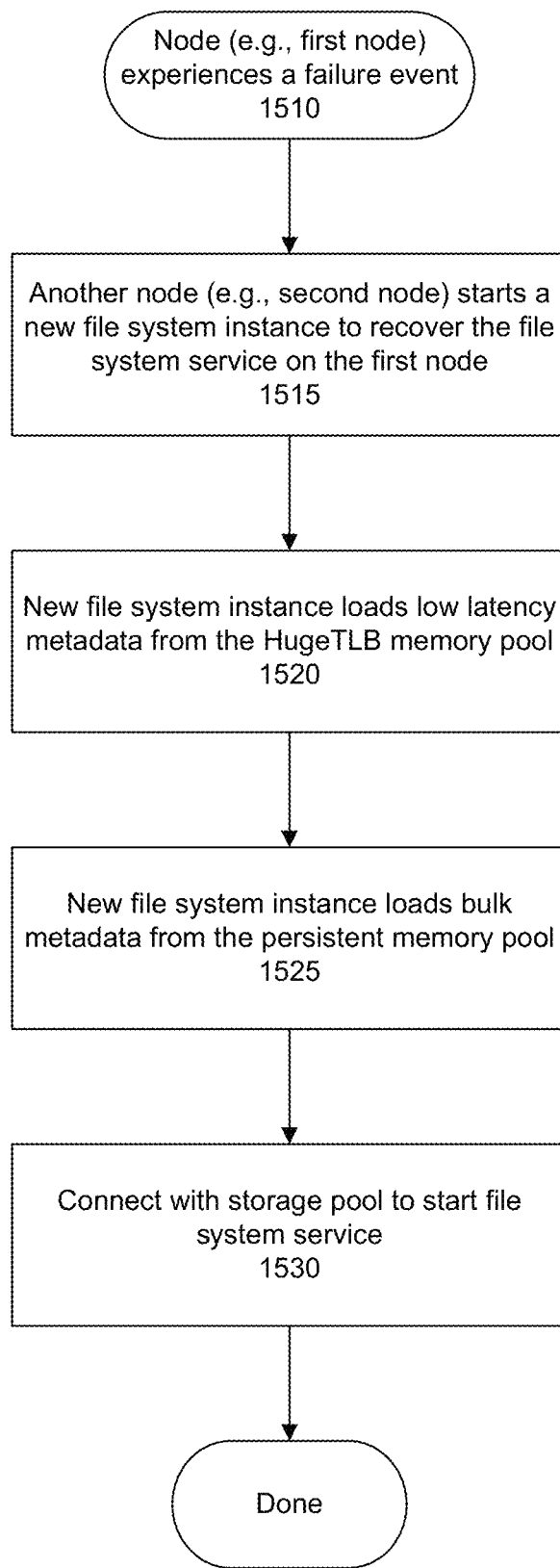
FIG. 15 shows an overall flow for restarting the instance of the file system on the new node as shown in FIG. 14, according to one or more embodiments.

FIG. 15 shows a flow for a fast failover of the file system when a node has failed. In a step 1510, a failure event has occurred and been detected on a node of the cluster (e.g., first node 1010A, FIG. 14). In a step 1515, another different node of the cluster (e.g., second node 1010B, FIG. 14) starts a new file system instance to recover the file system service that was being hosted on the failed node (e.g., first node 1010A, FIG. 14).

In a step 1520, the new file system instance (e.g., file system instance 1411, FIG. 14) loads low latency metadata from the HugeTLB memory pool. In a step 1525, the new file system instance loads bulk metadata from the persistent memory pool (see, e.g., metadata loadings 1417,1423, FIG. 14). As discussed, loading file system metadata from the HugeTLB memory pool and PMEM pool and not from the storage pool allows for a very fast starting of the file system instance on the second node. In a step 1530, the new file system instance connects with the storage pool to start the file system service.

Figure 16:
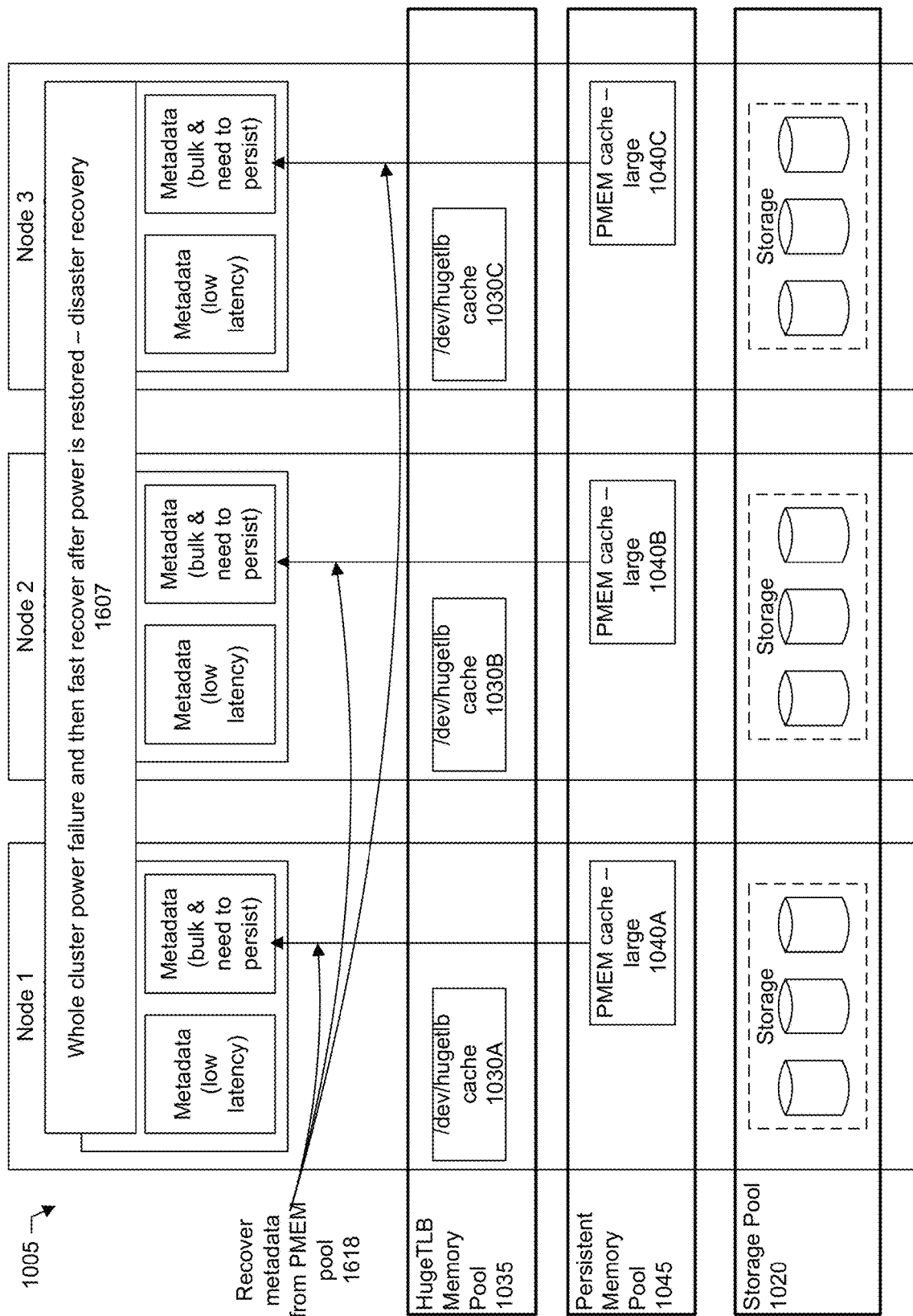
FIG. 16 shows an example of restarting file system instances in a cluster that has experienced a power failure, according to one or more embodiments.

FIG. 16 shows an architecture of the deduplicated file system shown in FIG. 10 when the whole cluster needs to be restored because of a power failure. The architecture allows for a fast restart of the entire file system. In the example of FIG. 16, the cluster has experienced a power failure 1607 and needs to be quickly recovered once power is restored. As a result of the power failure, the contents of the first memory tier (e.g., HugeTLB memory pool 1035) has been lost. However, file system metadata remains available from second memory tier 1045 because the second memory tier includes a pool of persistent memory devices. Thus, the file system metadata that was persisted to the second memory tier, e.g., PMEM pool, can be recovered 1618 from the second memory tier—rather than having to read and load the metadata from the storage pool.

Figure 17:
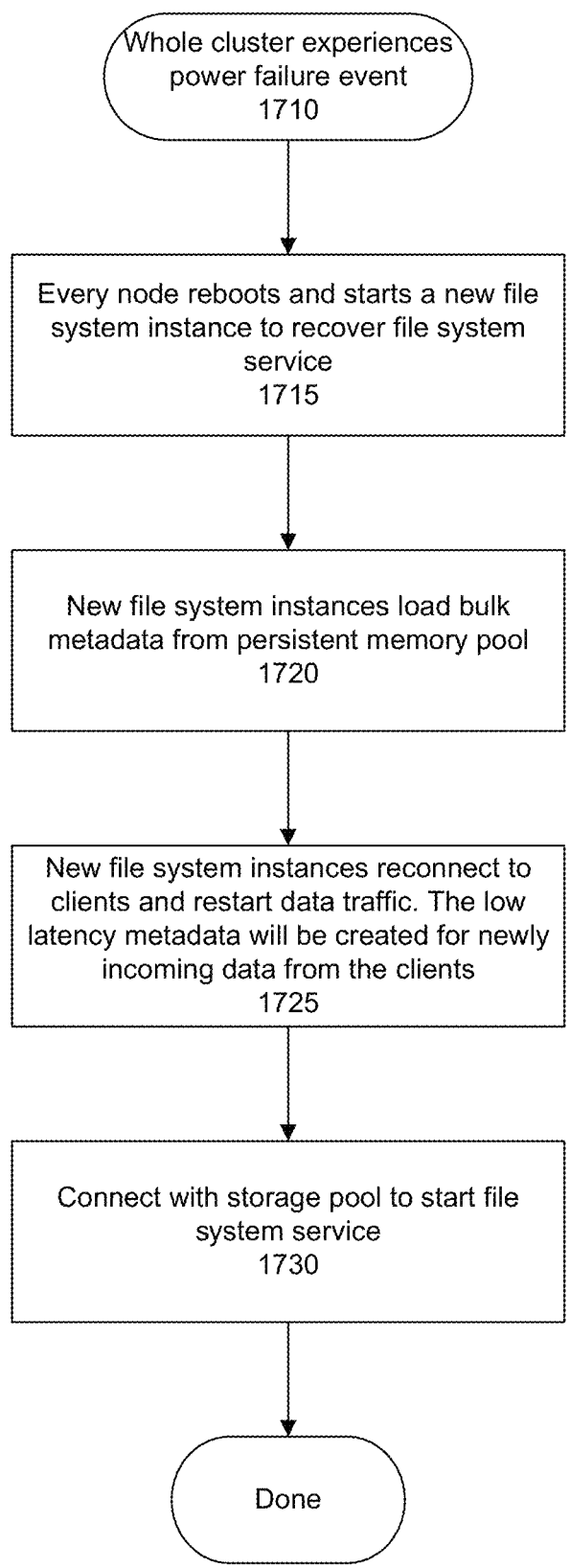
FIG. 17 shows an overall flow for restarting the file system instances shown in FIG. 16, according to one or more embodiments.

FIG. 17 shows a flow for a fast restart of the file system when the whole cluster needs to be restored from a power failure. In a step 1710, a whole cluster power failure event has occurred. In a step 1715, every node of the cluster reboots and starts a new file system instance to recover file system service. In a step 1720, each new file system instance loads bulk file system metadata from the persistent memory pool. In a step 1725, the new file system instances re-connects to the clients and restarts data traffic. The low latency metadata (e.g., fingerprint index) will be created for newly incoming data from the clients. In a step 1730, the new file system instances connect with the storage pool to start the file system service.

Thus, in an embodiment, the fingerprint index is written to the HugeTLB memory pool and is not written to the PMEM pool. A power failure of the whole cluster will then cause a loss of contents being held in the HugeTLB memory pool. As a result, the fingerprint index is loaded from the storage pool upon restart. However, once the file system restarts and resumes accepting incoming client data, the newly generated fingerprints corresponding to the data is written to the HugeTLB memory pool. In another embodiment, the fingerprint index is written to both the HugeTLB memory pool and the PMEM pool.

In an embodiment, a method includes: establishing, across a cluster of nodes hosting a deduplicated file system, first and second memory tiers, the first memory tier using volatile memory and comprising memory pages configured as huge pages, wherein writes to the huge pages are exported in a device file that is outside of a user process namespace within which processes of the deduplicated file system run, and the second memory tier comprising persistent memory (PMEM) devices; writing a first portion of metadata generated by the deduplicated file system to the first memory tier, the first portion of the metadata comprising an index of fingerprints corresponding to data segments stored by the deduplicated file system to a storage pool; writing a second portion of the metadata to the second memory tier, the second portion of the metadata comprising information tracking the data segments; upon a loss of power to the cluster, starting new instances of the deduplicated file system on each node of the cluster by loading metadata from the second memory tier; receiving files from backup clients of the deduplicated file system; segmenting the files into a plurality of segments and computing fingerprints of the segments; determining that at least a subset of the segments do not exist at the storage pool; storing the subset of segments to the storage pool; and writing, to the first memory tier, an index of fingerprints corresponding to segments of the subset of segments.

Figure 18:
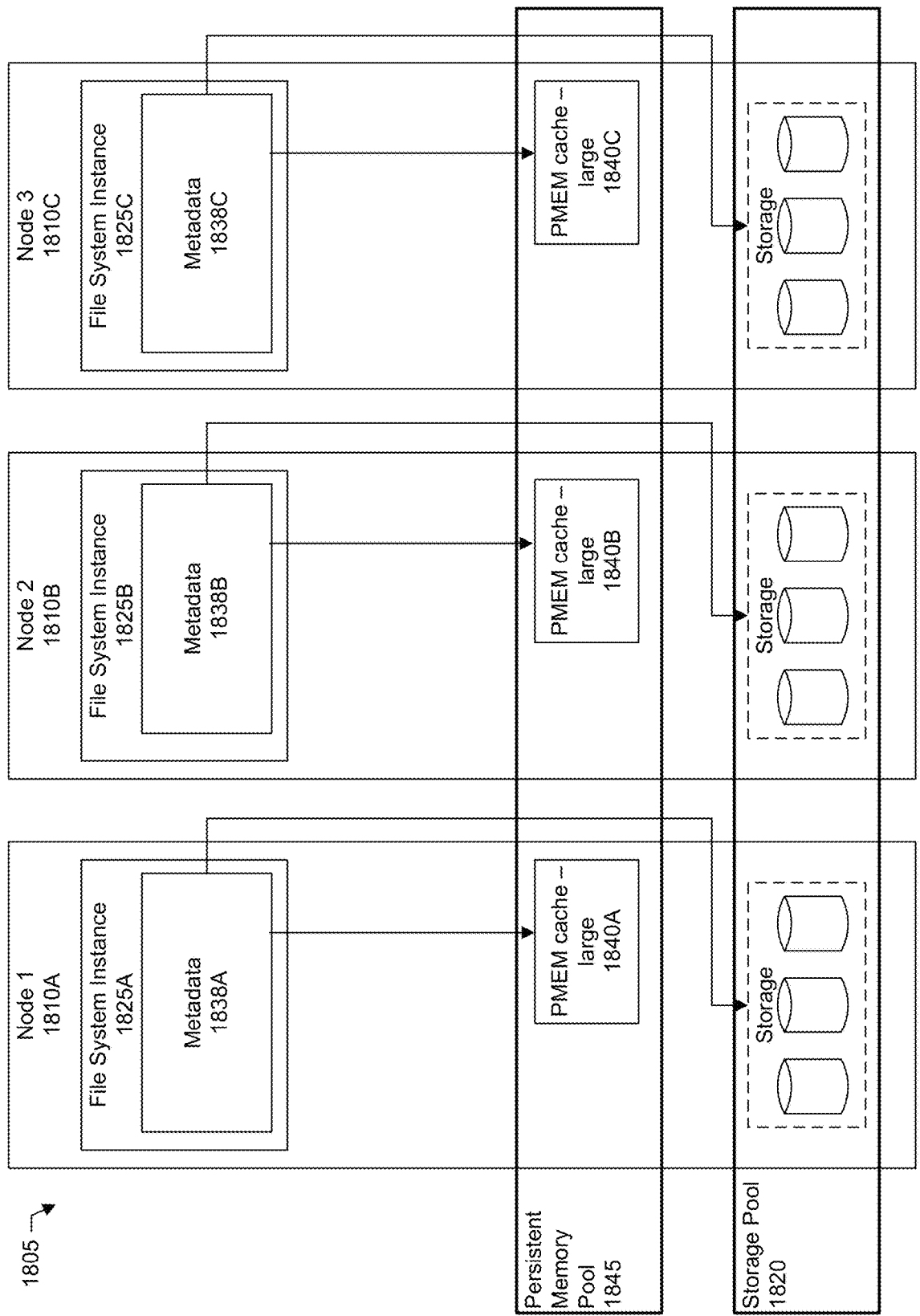
FIG. 18 shows an architecture of a deduplicated file system having a persistent memory pool, according to one or more embodiments.

FIG. 18 shows another architecture of a deduplicated file system. The architecture shown in FIG. 18 is similar to the architecture shown in FIG. 10. The architecture shown in FIG. 18, however, does not include the HugeTLB memory pool. More specifically, in the example shown in FIG. 18, a cluster 1805 includes nodes 1810A-C, and a storage pool 1820 accessible to the nodes. The nodes host instances 1825A-C, respectively, of the deduplicated file system. A memory tier having PMEM devices 1840A-C on respective nodes has been established as a PMEM memory pool 1845 across the nodes. Metadata 1838A-C generated by the file system, including data fingerprints, is persisted to the persistent memory pool (in addition to the storage pool). As discussed, writing file system metadata (e.g., fingerprint index) to PMEM allows the file system to be quickly recovered by loading file system metadata from a PMEM device. If a file system instance on a node should crash with the node remaining available, the file system instance can be restarted on the node and file system metadata can be recovered from PMEM local to the node. If the node itself should crash, the file system instance can be restarted on another node and file system metadata can be recovered from the PMEM pool.

Figure 19:
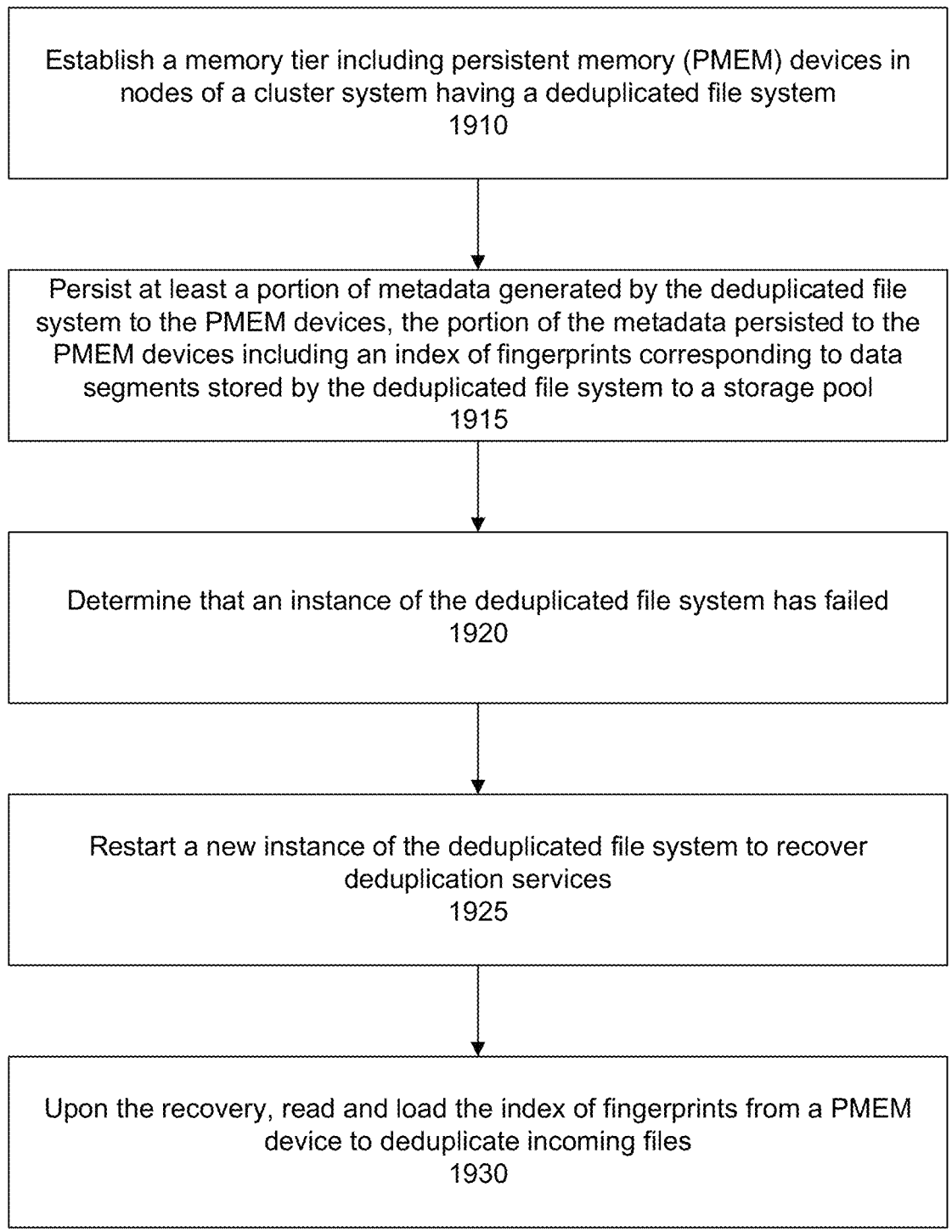
FIG. 19 shows an overall flow for restarting an instance of the file system in the architecture shown in FIG. 18.

More particularly, FIG. 19 shows a flow of the architecture shown in FIG. 18. In a step 1910, a memory tier including persistent memory devices is established in nodes of a cluster system having a deduplicated file system. In a step 1915, at least a portion of metadata generated by the deduplicated file system is persisted to the PMEM layer. The persisted metadata includes an index of fingerprints corresponding to data segments stored by the deduplicated file system to a storage pool.

In a step 1920, a determination is made that an instance of the deduplicated file system has failed. In a step 1925, a new instance of the deduplicated file system is restarted to recover deduplication services. In a step 1930, upon or as part of the recovery, the index of fingerprints is read and loaded from a PMEM device in order to deduplicate incoming files.

Figure 20:
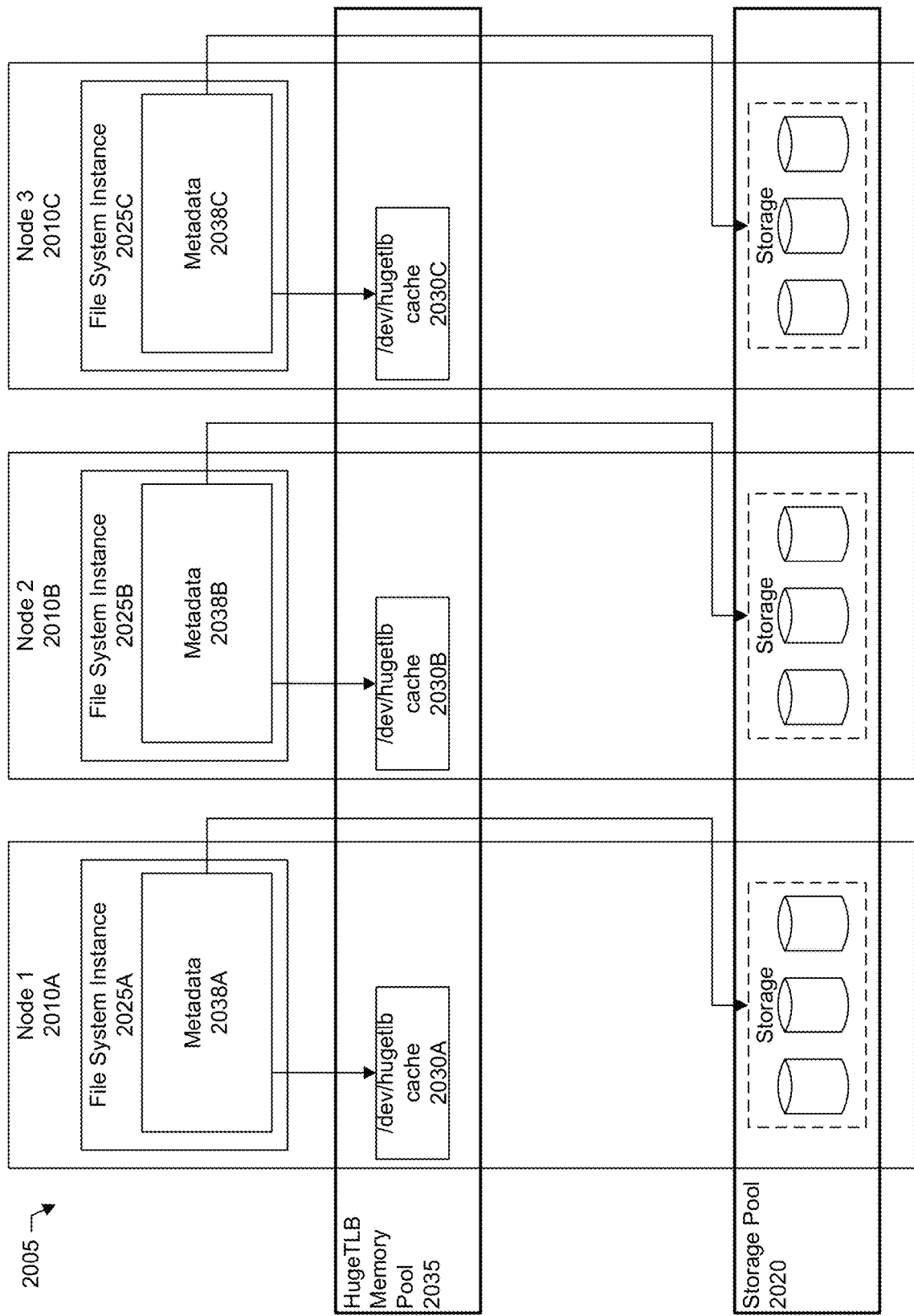
FIG. 20 shows an architecture of a deduplicated file system having a HugeTLB memory pool, according to one or more embodiments.

FIG. 20 shows another architecture of a deduplicated file system. The architecture shown in FIG. 20 is similar to the architecture shown in FIG. 10. The architecture shown in FIG. 20, however, does not include the persistent memory pool. More specifically, in the example shown in FIG. 20, a cluster 2005 includes nodes 2010A-C, and a storage pool 2020 accessible to the nodes. The nodes host instances 2025A-C, respectively, of the deduplicated file system. A memory tier having memory configured as HugeTLB pages 2030A-C on respective nodes has been established as a HugeTLB memory pool 2035 across the nodes. Metadata 2038A-C generated by the file system, including data fingerprints, is written to the HugeTLB memory pool (in addition to the storage pool). As discussed, writing file system metadata (e.g., fingerprint index) to HugeTLB memory pages allows the file system to be quickly recovered by loading file system metadata from a device file. If a file system instance on a node should crash with the node remaining available, the file system instance can be restarted on the node and file system metadata can be recovered from HugeTLB memory local to the node. If the node itself should crash, the file system instance can be restarted on another node and file system metadata can be recovered from the HugeTLB memory pool.

Figure 21:
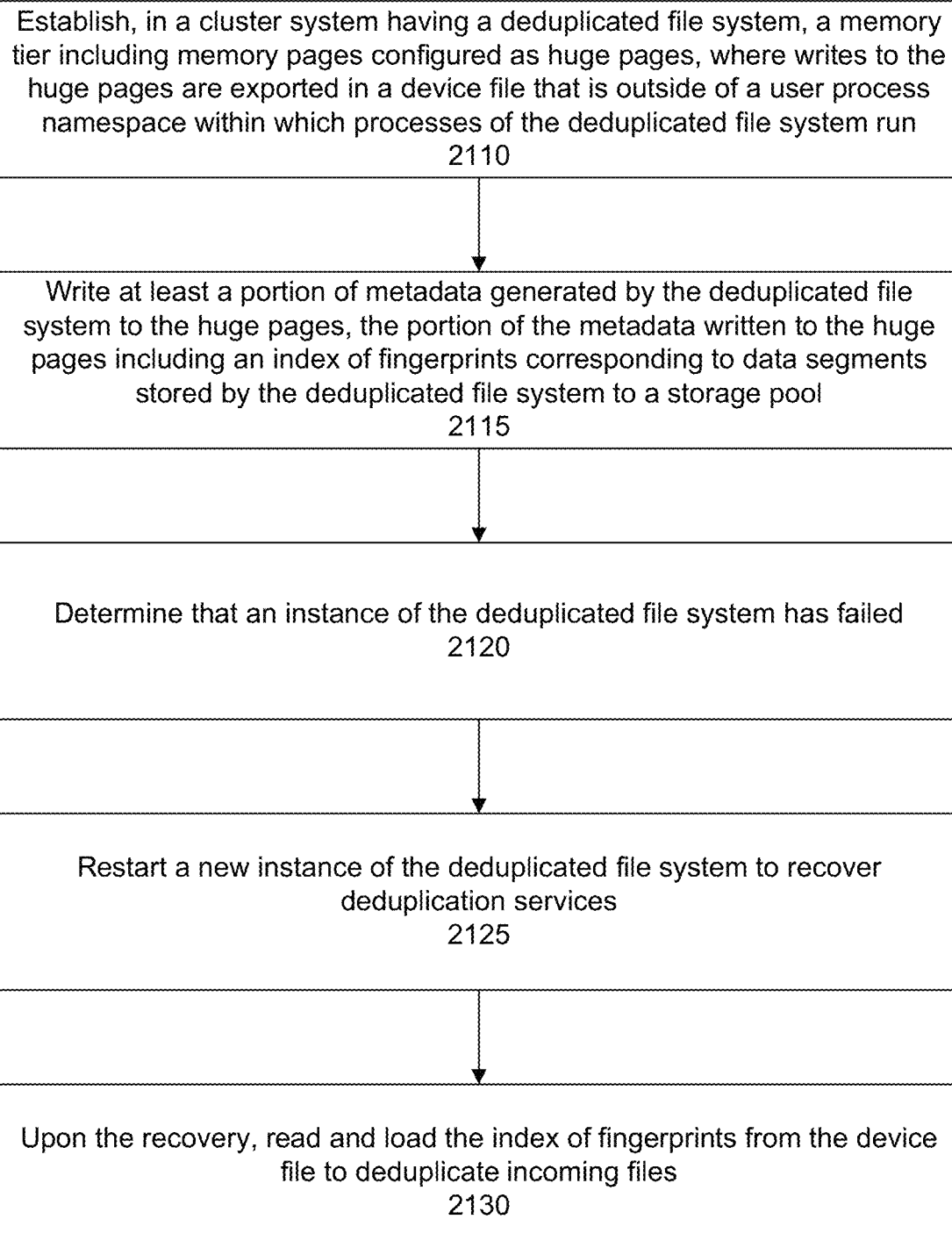
FIG. 21 shows an overall flow for restarting an instance of the file system in the architecture shown in FIG. 20, according to one or more embodiments.

More particularly, FIG. 21 shows a flow of the architecture shown in FIG. 20. In a step 2110, a memory tier including memory pages using huge pages is established in nodes of a cluster system having a deduplicated file system. As discussed, writes to the huge pages is exported in a device file that is outside of a user process namespace within which processes of the deduplicated file system run. In a step 2115, at least a portion of metadata generated by the deduplicated file system is persisted to the huge pages memory tier. In an embodiment, the at least portion of persisted metadata includes an index of fingerprints corresponding to data segments stored by the deduplicated file system to a storage pool.

In a step 2120, a determination is made that an instance of the deduplicated file system has failed. In a step 2125, a new instance of the deduplicated file system is restarted to recover file system or deduplication services. In a step 2130, upon or as part of the recovery, the index of fingerprints is read and loaded from the device file in order to deduplicate incoming files.

In an embodiment, there is a method comprising: establishing a memory tier comprising persistent memory (PMEM) devices in nodes of a cluster system having a deduplicated file system; persisting at least a portion of metadata generated by the deduplicated file system to the memory tier, the portion of the metadata persisted to the memory tier comprising an index of fingerprints corresponding to data segments stored by the deduplicated file system to a storage pool; determining that an instance of the deduplicated file system has failed; and starting a new instance of the deduplicated file system to recover file system services by loading the index of fingerprints from the memory tier. The method may include maintaining a complete copy of the metadata including the index of fingerprints at the storage pool.

The method may include determining that the instance of the deduplicated file system has failed on a first node of the cluster system; and reading the index of fingerprints from a PMEM device local to first node to start the new instance of the deduplicated file system on the first node. The method may include building a memory pool comprising the PMEM devices across the nodes of the cluster system; maintaining the index of fingerprints in the memory pool; determining that the instance of the deduplicated file system has failed on a first node of the cluster system; and starting the new instance of the deduplicated file system on a second node of the cluster system by reading the index of fingerprints from the memory pool.

The method may include applying at least one of erasure coding or mirroring of the index of fingerprints to build the memory tier as a memory pool across the nodes of the cluster system, the index of fingerprints thereby being available to each node of the cluster system through the memory pool.

In an embodiment, the instance of the deduplicated file system having failed is accompanied by a loss of content stored in a volatile memory buffer allocated to the deduplicated file system, and the method further comprises: reading the index of fingerprints persisted to the memory tier to load the index of fingerprints into a new volatile memory buffer allocated to the new instance of the deduplicated file system.

In another embodiment, there is a system comprising: a processor; and memory configured to store one or more sequences of instructions which, when executed by the processor, cause the processor to carry out the steps of: establishing a memory tier comprising persistent memory (PMEM) devices in nodes of a cluster system having a deduplicated file system; persisting at least a portion of metadata generated by the deduplicated file system to the memory tier, the portion of the metadata persisted to the memory tier comprising an index of fingerprints corresponding to data segments stored by the deduplicated file system to a storage pool; determining that an instance of the deduplicated file system has failed; and starting a new instance of the deduplicated file system to recover file system services by loading the index of fingerprints from the memory tier.

In another embodiment, there is a computer program product, comprising a non-transitory computer-readable medium having a computer-readable program code embodied therein, the computer-readable program code adapted to be executed by one or more processors to implement a method comprising: establishing a memory tier comprising persistent memory (PMEM) devices in nodes of a cluster system having a deduplicated file system; persisting at least a portion of metadata generated by the deduplicated file system to the memory tier, the portion of the metadata persisted to the memory tier comprising an index of fingerprints corresponding to data segments stored by the deduplicated file system to a storage pool; determining that an instance of the deduplicated file system has failed; and starting a new instance of the deduplicated file system to recover file system services by loading the index of fingerprints from the memory tier.

In an embodiment, there is a method comprising: establishing, in a cluster system having a deduplicated file system, a memory tier comprising memory pages configured as huge pages, wherein writes to the huge pages are exported in a device file that is outside of a user process namespace within which processes of the deduplicated file system run; writing at least a portion of metadata generated by the deduplicated file system to the huge pages, the portion of the metadata written to the huge pages comprising an index of fingerprints corresponding to data segments stored by the deduplicated file system to a storage pool; determining that an instance of the deduplicated file system has failed; and starting a new instance of the deduplicated file system to recover file system services by loading the index of fingerprints from the device file.

In an embodiment, the memory tier is a first memory tier, and the method further comprises: establishing a second memory tier comprising persistent memory (PMEM) devices in nodes of the cluster system; and writing another portion of the metadata generated by the deduplicated file system to the second memory tier, the other portion of the metadata comprising tree data structures tracking the data segments stored by the deduplicated file system to the storage pool.

In an embodiment, the memory tier is a first memory tier and the method further comprises: establishing a second memory tier, hierarchically below the first memory tier, and comprising persistent memory (PMEM) devices in nodes of the cluster system, wherein the first memory tier comprises volatile memory with the memory pages configured as huge pages, and a size of the second memory tier is greater than a size of the first memory tier.

In an embodiment, the failure of the instance of the deduplicated file system is accompanied by a crash of the user process namespace, and the index of fingerprints remains available in the memory tier because the device file is outside the user process namespace.

The method may include maintaining a complete copy of the metadata including the index of fingerprints in the storage pool. The method may include building a memory pool comprising the huge pages across nodes of the cluster system; maintaining the index of fingerprints in the memory pool; determining that the instance of deduplicated file system has failed on a first node of the cluster system; and starting the new instance of the deduplicated file system on a second node of the cluster system by reading the index of fingerprints from the memory pool.

In an embodiment, there is a system comprising: a processor; and memory configured to store one or more sequences of instructions which, when executed by the processor, cause the processor to carry out the steps of: establishing, in a cluster system having a deduplicated file system, a memory tier comprising memory pages configured as huge pages, wherein writes to the huge pages are exported in a device file that is outside of a user process namespace within which processes of the deduplicated file system run; writing at least a portion of metadata generated by the deduplicated file system to the huge pages, the portion of the metadata written to the huge pages comprising an index of fingerprints corresponding to data segments stored by the deduplicated file system to a storage pool; determining that an instance of the deduplicated file system has failed; and starting a new instance of the deduplicated file system to recover file system services by loading the index of fingerprints from the device file.

In an embodiment, there is a computer program product, comprising a non-transitory computer-readable medium having a computer-readable program code embodied therein, the computer-readable program code adapted to be executed by one or more processors to implement a method comprising: establishing, in a cluster system having a deduplicated file system, a memory tier comprising memory pages configured as huge pages, wherein writes to the huge pages are exported in a device file that is outside of a user process namespace within which processes of the deduplicated file system run; writing at least a portion of metadata generated by the deduplicated file system to the huge pages, the portion of the metadata written to the huge pages comprising an index of fingerprints corresponding to data segments stored by the deduplicated file system to a storage pool; determining that an instance of the deduplicated file system has failed; and starting a new instance of the deduplicated file system to recover file system services by loading the index of fingerprints from the device file.

Figure 22:
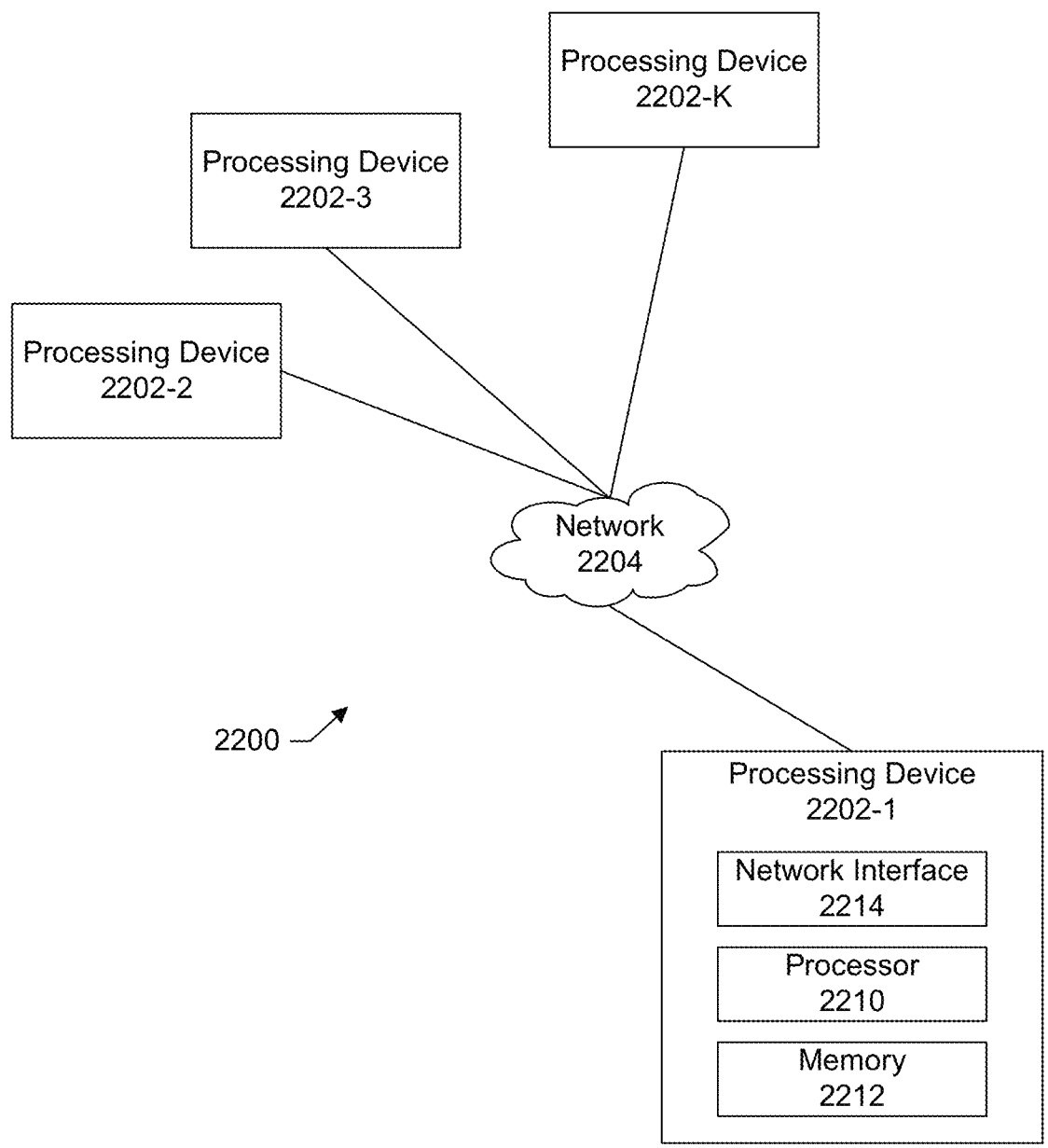
FIG. 22 shows a block diagram of a processing platform that may be utilized to implement at least a portion of an information processing system, according to one or more embodiments.

FIG. 22 shows an example of a processing platform 2200 that may include at least a portion of the information handling system shown in FIG. 1. The example shown in FIG. 22 includes a plurality of processing devices, denoted 2202-1, 2202-2, 2202-3, . . . 2202-K, which communicate with one another over a network 2204.

The network 2204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2202-1 in the processing platform 2200 comprises a processor 2210 coupled to a memory 2212.

The processor 2210 may comprise a microprocessor, a microcontroller, an application-specific integrated circuit (ASIC), a field-programmable gate array (FPGA) or other type of processing circuitry, as well as portions or combinations of such circuitry elements.

The memory 2212 may comprise random access memory (RAM), read-only memory (ROM) or other types of memory, in any combination. The memory 2212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2202-1 is network interface circuitry 2214, which is used to interface the processing device with the network 2204 and other system components, and may comprise conventional transceivers.

The other processing devices 2202 of the processing platform 2200 are assumed to be configured in a manner similar to that shown for processing device 2202-1 in the figure.

Again, the particular processing platform 2200 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 23:
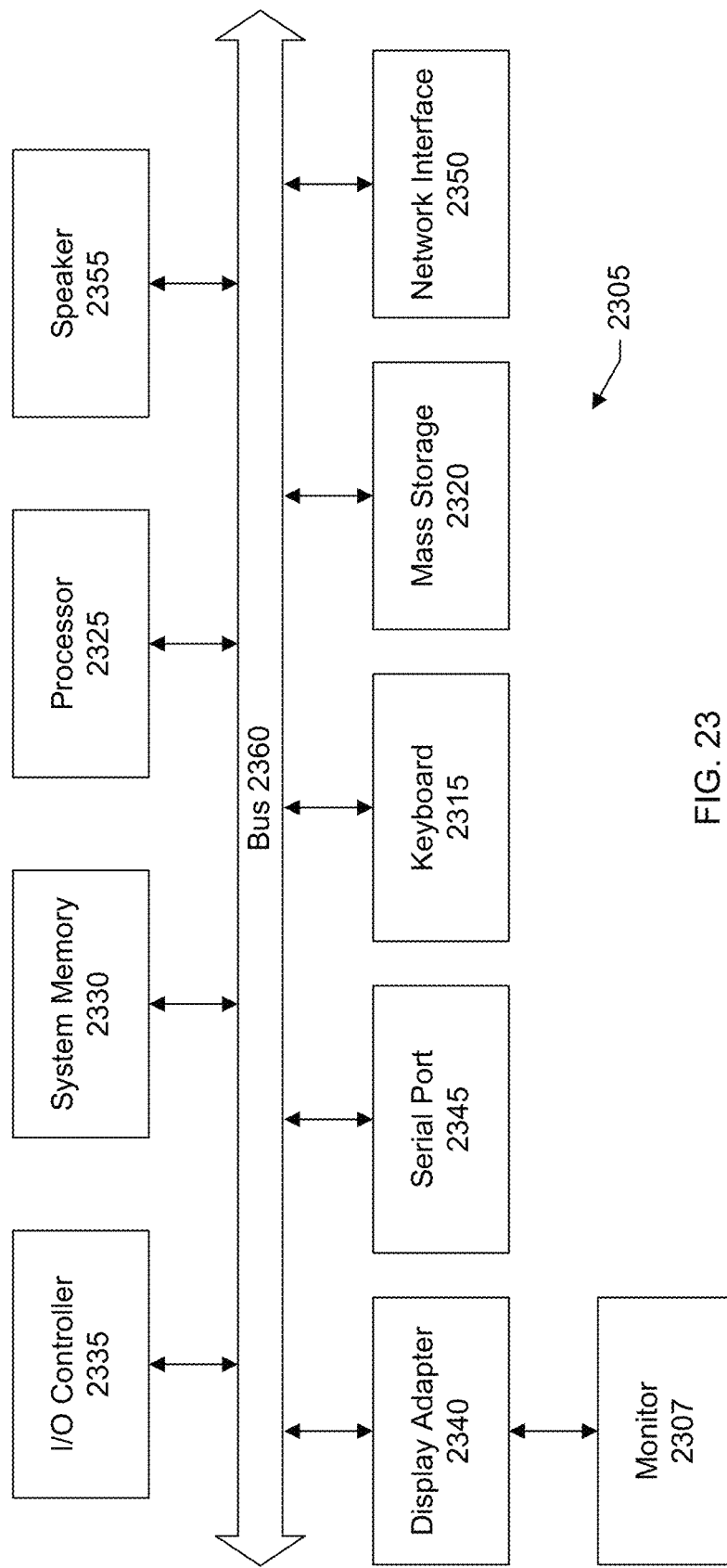
FIG. 23 shows a block diagram of a computer system suitable for use with the system, according to one or more embodiments.

FIG. 23 shows a system block diagram of a computer system 2305 used to execute the software of the present system described herein. The computer system includes a monitor 2307, keyboard 2315, and mass storage devices 2320. Computer system 2305 further includes subsystems such as central processor 2325, system memory 2330, input/output (I/O) controller 2335, display adapter 2340, serial or universal serial bus (USB) port 2345, network interface 2350, and speaker 2355. The system may also be used with computer systems with additional or fewer subsystems. For example, a computer system could include more than one processor 2325 (i.e., a multiprocessor system) or a system may include a cache memory.

Arrows such as 2360 represent the system bus architecture of computer system 2305. However, these arrows are illustrative of any interconnection scheme serving to link the subsystems. For example, speaker 2355 could be connected to the other subsystems through a port or have an internal direct connection to central processor 2325. The processor may include multiple processors or a multicore processor, which may permit parallel processing of information. Computer system 2305 shown in FIG. 23 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
   establishing a first memory tier comprising memory pages configured as huge pages in nodes of a cluster system having a deduplicated file system;
   establishing a second memory tier comprising persistent memory (PMEM) devices in the nodes of the cluster system, the PMEM devices comprising byte-addressable devices;
   writing, to the first memory tier having the huge pages, an index of fingerprints corresponding to data segments, the data segments being user data and stored by the deduplicated file system to a storage pool, the storage pool comprising block-addressable devices, wherein writes, including the index of fingerprints, to the huge pages are exported to a device file as user data enters the deduplicated file system for deduplication, the device file being in a namespace separate from a namespace of the deduplicated file system;
   as the user data enters the deduplicated file system, accessing, as a file and by an operating system kernel of the deduplicated file system, the writes of the index of fingerprints exported to the device file for the deduplication;
   writing the index of fingerprints to the storage pool;
   writing, to the second memory tier, tree data structures tracking the data segments;
   determining that an instance of the deduplicated file system has failed on a first node; and
   when the first node remains available after the instance of the deduplicated file system has failed,
      starting a new instance of the deduplicated file system on the first node; and
      loading the index of fingerprints from a first device file and the tree data structures from a first PMEM device of the first node, and not from the storage pool to recover file system services; and
   when the first node is not available after the instance of the deduplicated file system has failed,
      starting a new instance of the deduplicated file system on a second node of the cluster; and
      loading the index of fingerprints from a second device file and the tree data structures from a second PMEM device of the second node, and not from the storage pool, wherein the huge memory pages comprise HugeTLB memory pages that are outside a user space having processes of the deduplicated file system, each HugeTLB memory page having a size greater than 4 KB.

2. The method of claim 1 wherein the second memory tier comprising the PMEM devices is in addition to main memory that is present locally in each node, the main memory being volatile memory.

3. The method of claim 1 wherein each node of the cluster is associated with a deduplication domain within which deduplication is performed, a particular deduplication domain thereby having a particular index of fingerprints.

4. The method of claim 1 further comprising:
   applying at least one of erasure coding or mirroring of the index of fingerprints to build the first memory tier as a memory pool across the nodes of the cluster system, the index of fingerprints thereby being available to each node of the cluster system through the first memory pool.

5. The method of claim 1 wherein the instance of the deduplicated file system having failed on the first node is accompanied by a loss of content stored in a volatile memory buffer allocated to the deduplicated file system, and the method further comprises:
   accessing, at the first node, the first device file associated with the first memory tier to retrieve the index of fingerprints, the first device file remaining available in the first memory tier and at the first node despite the instance of the deduplicated file system having failed on the first node because the first device file is in the namespace separate from the namespace of the deduplicated file system.

6. A system comprising: a processor; and memory configured to store one or more sequences of instructions which, when executed by the processor, cause the processor to carry out the steps of:
   establishing a first memory tier comprising memory pages configured as huge pages in nodes of a cluster system having a deduplicated file system;
   establishing a second memory tier comprising persistent memory (PMEM) devices in the nodes of the cluster system, the PMEM devices comprising byte-addressable devices coupled to central processing units (CPUs) of the nodes by memory busses;
   writing, to the first memory tier having the huge pages, an index of fingerprints corresponding to data segments, the data segments being user data and stored by the deduplicated file system to a storage pool, the storage pool comprising block-addressable devices and being in a hierarchy that is below the memory tier, wherein writes, including the index of fingerprints, to the huge pages are exported to a device file as user data enters the deduplicated file system for deduplication, the device file being in a namespace separate and different from a namespace of the deduplicated file system, being managed by an operating system kernel, being located in a directory identified as/dev, and providing an interface to a device driver;
   as the user data enters the deduplicated file system, accessing, as a file and by the operating system kernel of the deduplicated file system, the writes of the index of fingerprints exported to the device file for the deduplication;
   writing the index of fingerprints to the storage pool;
   writing, to the second memory tier, tree data structures tracking the data segments;
   determining that an instance of the deduplicated file system has failed on a first node; and
   when the first node remains available after the instance of the deduplicated file system has failed,
      starting a new instance of the deduplicated file system on the first node; and
      loading the index of fingerprints from a first device file and the tree data structures from a first PMEM device of the first node, and not from the storage pool to recover file system services; and
   when the first node is not available after the instance of the deduplicated file system has failed,
      starting a new instance of the deduplicated file system on a second node of the cluster; and loading the index of fingerprints from a second device file and the tree data structures from a second PMEM device of the second node, and not from the storage pool, wherein the huge memory pages comprise HugeTLB memory pages that are outside a user space having processes of the deduplicated file system, a crash of the user space thereby not causing a loss of the index of fingerprints because the HugeTLB memory pages are outside the user space, each HugeTLB memory page having a size greater than 4 KB.

7. The system of claim 6 wherein the second memory tier comprising the PMEM devices is in addition to main memory that is present locally in each node, the main memory being volatile memory.

8. The system of claim 6 wherein each node of the cluster is associated with a deduplication domain within which deduplication is performed, a particular deduplication domain thereby having a particular index of fingerprints.

9. The system of claim 6 wherein the processor further carries out the steps of:
applying at least one of erasure coding or mirroring of the index of fingerprints to build the first memory tier as a memory pool across the nodes of the cluster system, the index of fingerprints thereby being available to each node of the cluster system through the first memory pool.

10. The system of claim 6 wherein the instance of the deduplicated file system having failed is accompanied by a loss of content stored in a volatile memory buffer allocated to the deduplicated file system, and the processor further carries out the steps of:
accessing the device file associated with the first memory tier to retrieve the index of fingerprints, the device file remaining available in the first memory tier despite the instance of the deduplicated file system having failed because the device file is in the namespace separate from the namespace of the deduplicated file system.

11. A computer program product, comprising a non-transitory computer-readable medium having a computer-readable program code embodied therein, the computer-readable program code adapted to be executed by one or more processors to implement a method comprising:
establishing a first memory tier comprising memory pages configured as huge pages in nodes of a cluster system having a deduplicated file system, the deduplicated file system running in a user space, and the huge pages being outside the user space within which processes of the deduplicated file system run;
establishing a second memory tier comprising persistent memory (PMEM) devices in the nodes of the cluster system, the PMEM devices comprising byte-addressable devices;
writing, to the first memory tier having the huge pages, an index of fingerprints corresponding to data segments of user files stored by the deduplicated file system to a storage pool comprising block-addressable devices, wherein writes, including the index of fingerprints, to the huge pages at a node of the cluster are exported to a device file, also at the node, as user data enters the deduplicated file system for deduplication, the device file being in a namespace separate from a namespace of the deduplicated file system;
as the user data enters the deduplicated file system, accessing, as a file and by an operating system kernel of the deduplicated file system, the writes of the index of fingerprints exported to the device file for the deduplication;
writing the index of fingerprints to the storage pool;
writing, to the second memory tier, tree data structures tracking the data segments;
determining that an instance of the deduplicated file system has failed on a first node; and
when the first node remains available after the instance of the deduplicated file system has failed,
starting a new instance of the deduplicated file system on the first node; and
loading the index of fingerprints from a first device file and the tree data structures from a first PMEM device of the first node, and not from the storage pool to recover file system services; and
when the first node is not available after the instance of the deduplicated file system has failed,
starting a new instance of the deduplicated file system on a second node of the cluster; and
loading the index of fingerprints from a second device file and the tree data structures from a second PMEM device of the second node, and not from the storage pool, wherein the huge memory pages comprise HugeTLB memory pages, each HugeTLB memory page having a size greater than 4 KB.

12. The computer program product of claim 11 wherein the second memory tier comprising the PMEM devices is in addition to main memory that is present locally in each node, the main memory being volatile memory.

13. The computer program product of claim 11 wherein each node of the cluster is associated with a deduplication domain within which deduplication is performed, a particular deduplication domain thereby having a particular index of fingerprints.

14. The computer program product of claim 11 wherein the method further comprises:
applying at least one of erasure coding or mirroring of the index of fingerprints to build the first memory tier as a memory pool across the nodes of the cluster system, the index of fingerprints thereby being available to each node of the cluster system through the memory pool.

15. The computer program product of claim 11 wherein the instance of the deduplicated file system having failed is accompanied by a loss of content stored in a volatile memory buffer allocated to the deduplicated file system, and the method further comprises:
accessing the device file associated with the first memory tier to retrieve the index of fingerprints, the device file remaining available in the first memory tier despite the instance of the deduplicated file system having failed because the device file is in the namespace separate from the namespace of the deduplicated file system.

16. The method of claim 1 wherein the index of fingerprints loaded from the first device file when the first node remains available after the instance of the deduplicated file system has failed is written and exported from the huge pages of the first node to the first device file on the first node before the instance of the deduplicated file system has failed.

17. The method of claim 1 further comprising:
generating metadata associated with the deduplication;
determining whether the metadata is associated with the fingerprint index, thereby requiring low latency, or is associated with a tree data structure, thereby not requiring as low latency;

if the metadata is associated with the fingerprint index, thereby requiring low latency, writing the metadata to the first memory tier having the huge pages; and if the metadata is associated with the tree data structure, thereby not requiring as low latency, writing the metadata to the second memory tier having the PMEM devices.

\* \* \* \* \*